United States Patent
Kolanek et al.

(10) Patent No.: US 10,948,909 B2
(45) Date of Patent: Mar. 16, 2021

(54) METHODS AND APPARATUSES FOR ENGAGEMENT MANAGEMENT OF AERIAL THREATS

(71) Applicant: Northrop Grumman Innovation Systems, Inc., Plymouth, MN (US)

(72) Inventors: James Kolanek, Goleta, CA (US); Behshad Baseghi, Santa Barbara, CA (US); David Sharpin, Simi Valley, CA (US); Anthony Visco, Woodland Hills, CA (US); Falin Shieh, Calabasas, CA (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 62 days.

(21) Appl. No.: 16/296,742

(22) Filed: Mar. 8, 2019

(65) Prior Publication Data
US 2019/0258241 A1    Aug. 22, 2019

Related U.S. Application Data

(63) Continuation of application No. 15/355,839, filed on Nov. 18, 2016, now Pat. No. 10,228,689, which is a
(Continued)

(51) Int. Cl.
*G05D 1/00*        (2006.01)
*G01S 13/88*       (2006.01)
(Continued)

(52) U.S. Cl.
CPC ........... *G05D 1/0022* (2013.01); *F41G 7/306* (2013.01); *F41G 7/308* (2013.01); *F41H 11/02* (2013.01); *F42B 15/01* (2013.01); *G01S 13/883* (2013.01)

(58) Field of Classification Search
CPC .................................................. G05D 1/0022
See application file for complete search history.

(56) References Cited

U.S. PATENT DOCUMENTS 3,231,223 A    1/1966  Upper
3,350,886 A    11/1967 Adrien et al.
(Continued)

FOREIGN PATENT DOCUMENTS

DE    112005000582 T5   2/2007
EP         0418636 A2   3/1991
(Continued)

OTHER PUBLICATIONS

Written Opinion of the International Searching Authority, ISA/EP, for Application No. PCT/US2013/074340, dated Mar. 27, 2014, 6 pages.
(Continued)

*Primary Examiner* — Alex C Dunn
(74) *Attorney, Agent, or Firm* — TraskBritt

(57) ABSTRACT

Embodiments include engagement management systems and methods for managing engagement with aerial threats. Such systems include radar modules and detect aerial threats within a threat range of a base location. The systems also track intercept vehicles and control flight paths and detonation capabilities of the intercept vehicles. The systems are capable of communication between multiple engagement management systems and coordinated control of multiple intercept vehicles.

45 Claims, 29 Drawing Sheets

Related U.S. Application Data continuation of application No. 13/839,176, filed on Mar. 15, 2013, now Pat. No. 9,501,055, which is a continuation-in-part of application No. 13/455,831, filed on Apr. 25, 2012, now Pat. No. 9,170,070.

(60) Provisional application No. 61/606,010, filed on Mar. 2, 2012, provisional application No. 61/736,440, filed on Dec. 12, 2012.

(51) Int. Cl.
    *F41G 7/30* (2006.01)
    *F41H 11/02* (2006.01)
    *F42B 15/01* (2006.01)

(56) References Cited

U.S. PATENT DOCUMENTS

| | | |
|---|---|---|
| 3,612,442 A | 10/1971 | Chisel |
| 3,614,027 A | 10/1971 | Lewis |
| 3,624,367 A | 11/1971 | Hamilton et al. |
| 3,667,044 A | 5/1972 | Vaughan et al. |
| 3,693,909 A | 9/1972 | Hall |
| 3,732,693 A | 5/1973 | Chu |
| 3,735,944 A | 5/1973 | Bannett et al. |
| 3,788,069 A | 1/1974 | Schmidt |
| 3,802,190 A | 4/1974 | Kaufmann |
| 3,808,940 A | 5/1974 | Schillreff et al. |
| 3,841,585 A | 10/1974 | Evers Euterneck |
| 3,926,390 A | 12/1975 | Teuber et al. |
| 4,008,869 A | 2/1977 | Weiss |
| 4,063,485 A | 12/1977 | Carter et al. |
| 4,093,153 A | 6/1978 | Bardash et al. |
| 4,332,360 A | 6/1982 | Topliffe |
| 4,408,735 A | 10/1983 | Metz |
| 4,470,562 A | 9/1984 | Hall et al. |
| 4,482,107 A | 11/1984 | Metz |
| 4,568,940 A | 2/1986 | Diamond |
| 4,635,880 A | 1/1987 | Jehle |
| 4,762,293 A | 8/1988 | Waddington |
| 4,848,706 A | 7/1989 | Garg et al. |
| 4,925,129 A | 5/1990 | Salkeld et al. |
| 4,967,982 A | 11/1990 | Bagley |
| 5,054,712 A | 10/1991 | Bar et al. |
| 5,062,593 A | 11/1991 | Goddard et al. |
| 5,071,087 A | 12/1991 | Gray |
| 5,082,200 A | 1/1992 | Gray |
| 5,114,094 A | 5/1992 | Harris |
| 5,118,050 A | 6/1992 | Arnold et al. |
| 5,129,604 A | 7/1992 | Bagley |
| 5,238,204 A | 8/1993 | Metz |
| 5,259,569 A | 11/1993 | Waymeyer et al. |
| 5,456,425 A | 10/1995 | Morris et al. |
| 5,456,429 A | 10/1995 | Mayersak |
| 5,478,028 A | 12/1995 | Snyder |
| 5,533,331 A | 7/1996 | Campbell et al. |
| 5,631,830 A | 5/1997 | Schroeder |
| 5,855,339 A | 1/1999 | Mead et al. |
| 5,917,442 A | 6/1999 | Manoogian |
| 6,135,393 A | 10/2000 | Sackheim et al. |
| 6,179,246 B1 | 1/2001 | Fisel et al. |
| 6,209,820 B1 | 4/2001 | Golan et al. |
| 6,231,002 B1 | 5/2001 | Hibma et al. |
| 6,231,003 B1 | 5/2001 | Hibma et al. |
| 6,267,326 B1 | 7/2001 | Smith et al. |
| RE37,331 E | 8/2001 | Schroeder |
| 6,289,669 B1 | 9/2001 | Smirra |
| 6,347,763 B1 | 2/2002 | Harkins et al. |
| 6,360,986 B1 | 3/2002 | Larcher et al. |
| 6,565,036 B1 | 5/2003 | Palathingal et al. |
| 6,588,700 B2 | 7/2003 | Moore et al. |
| 6,603,421 B1 * | 8/2003 | Schiff ............... G01S 13/86 342/13 |
| 6,610,971 B1 | 8/2003 | Crabtree |
| 6,629,668 B1 | 10/2003 | Grau et al. |
| 6,630,902 B1 * | 10/2003 | Fenton ............... G01S 13/72 342/100 |
| 6,672,533 B1 | 1/2004 | Regebro |
| 6,717,543 B2 | 4/2004 | Pappert et al. |
| 6,889,935 B2 | 5/2005 | O'Dwyer |
| 6,920,827 B2 | 7/2005 | Llyod |
| 7,004,423 B2 | 2/2006 | Folsom et al. |
| 7,102,113 B2 | 9/2006 | Fujita et al. |
| 7,239,377 B2 * | 7/2007 | Vermillion ............... G01C 3/08 356/4.01 |
| 7,269,920 B2 * | 9/2007 | Staley, III ............... F41G 1/38 42/111 |
| 7,277,046 B2 | 10/2007 | Adams et al. |
| 7,287,725 B2 | 10/2007 | Chasman et al. |
| 7,416,154 B2 | 8/2008 | Bittle et al. |
| 7,494,089 B2 | 2/2009 | Williams et al. |
| 7,654,185 B1 | 2/2010 | Yannone |
| 7,658,031 B2 * | 2/2010 | Cross ............... F41G 1/473 42/142 |
| 7,714,261 B2 | 5/2010 | Bnayahu et al. |
| 7,832,137 B2 * | 11/2010 | Sammut ............... F41G 3/06 42/111 |
| 7,851,732 B2 | 12/2010 | Brinkerhoff et al. |
| 7,875,838 B1 | 1/2011 | Starken |
| 7,886,646 B2 | 2/2011 | Bannasch et al. |
| 7,899,644 B2 | 3/2011 | Weber et al. |
| 7,977,614 B2 | 7/2011 | Raviv |
| 7,989,743 B2 | 8/2011 | Brinkerhoff et al. |
| 8,020,482 B1 | 9/2011 | McCants, Jr. |
| 8,084,724 B1 | 12/2011 | Brosch et al. |
| 8,084,725 B1 | 12/2011 | Dryer |
| 8,084,726 B2 | 12/2011 | Hanlon et al. |
| 8,089,033 B2 | 1/2012 | Zank et al. |
| 8,157,169 B2 | 4/2012 | Olden et al. |
| 8,173,946 B1 | 5/2012 | Patterson et al. |
| 8,242,422 B2 | 8/2012 | Olden et al. |
| 8,338,768 B2 | 12/2012 | Hanlon et al. |
| 8,423,336 B2 | 4/2013 | Bennett et al. |
| 8,436,283 B1 | 5/2013 | Tournes et al. |
| 8,464,949 B2 | 6/2013 | Namey et al. |
| 8,575,526 B1 | 11/2013 | Colvin et al. |
| 8,584,443 B1 | 11/2013 | Carlson |
| 8,735,788 B2 | 5/2014 | Preston et al. |
| 8,757,486 B2 | 6/2014 | Cook et al. |
| 8,800,913 B2 | 8/2014 | Pagliara et al. |
| 8,809,755 B1 * | 8/2014 | Patel ............... B64C 9/08 244/3.26 |
| 9,170,070 B2 | 10/2015 | Sharpin et al. |
| 2003/0210170 A1 | 11/2003 | Krikorian et al. |
| 2005/0103925 A1 | 5/2005 | Folsom et al. |
| 2005/0184192 A1 | 8/2005 | Schneider |
| 2006/0238403 A1 | 10/2006 | Golan et al. |
| 2006/0283317 A1 | 12/2006 | Melnychuk et al. |
| 2007/0169616 A1 | 7/2007 | Vickroy |
| 2010/0026554 A1 | 2/2010 | Longman et al. |
| 2010/0162915 A1 | 7/2010 | Rastegar |
| 2010/0275576 A1 | 11/2010 | Gutman et al. |
| 2010/0282892 A1 | 11/2010 | Hanlon et al. |
| 2010/0313741 A1 | 12/2010 | Smogitel |
| 2011/0049289 A1 | 3/2011 | Kinsey et al. |
| 2011/0082604 A1 | 4/2011 | Lam |
| 2011/0101097 A1 | 5/2011 | Olden et al. |
| 2011/0120294 A1 | 5/2011 | Beach et al. |
| 2011/0127328 A1 | 6/2011 | Warren |
| 2011/0196551 A1 | 8/2011 | Lees et al. |
| 2012/0091252 A1 | 4/2012 | Zatterqvist |
| 2012/0199690 A1 | 8/2012 | Rastegar et al. |
| 2012/0248237 A1 | 10/2012 | Dolphin |
| 2014/0138474 A1 | 5/2014 | Sharpin et al. |
| 2014/0303884 A1 | 10/2014 | Levien et al. |

FOREIGN PATENT DOCUMENTS

| | | |
|---|---|---|
| EP | 0471225 A2 | 2/1992 |
| EP | 2624011 A1 | 8/2013 |
| FR | 2444253 A3 | 7/1980 |
| GB | 2265342 A | 9/1993 |
| JP | 07-334244 A | 12/1995 |

(56) References Cited

FOREIGN PATENT DOCUMENTS

| | | | |
|---|---|---|---|
| JP | 2005-155953 | A | 6/2005 |
| JP | 5491877 | B2 | 5/2014 |
| WO | 03/94292 | A1 | 11/2003 |
| WO | 2005/098346 | A1 | 10/2005 |
| WO | 2006/079029 | A2 | 7/2006 |
| WO | 2008/035338 | A2 | 3/2008 |
| WO | 2009/045573 | A1 | 4/2009 |
| WO | 2010/036418 | A2 | 4/2010 |
| WO | 2010/147520 | A1 | 12/2010 |
| WO | 2011/028304 | A1 | 3/2011 |

OTHER PUBLICATIONS

International Search Report for International Application No. PCT/US2013/074340, dated Mar. 27, 2014, 4 pages.
Written Opinion of the International Searching Authority, ISA/EP, Application No. PCT/US2014/023109, dated Oct. 16, 2014, seven (7) pages.
International Search Report, ISA/EP, Application No. PCT/US2014/023109, dated Oct. 16, 2014, four (4) pages.
Written Opinion of the International Search Authority, ISA/EP, for Application No. PCT/US2013/027898, dated Jun. 5, 2013, 6 pages.
International Search Report for International Application No. PCT/US2013/027898, dated Jun. 5, 2013, 5 pages.

\* cited by examiner

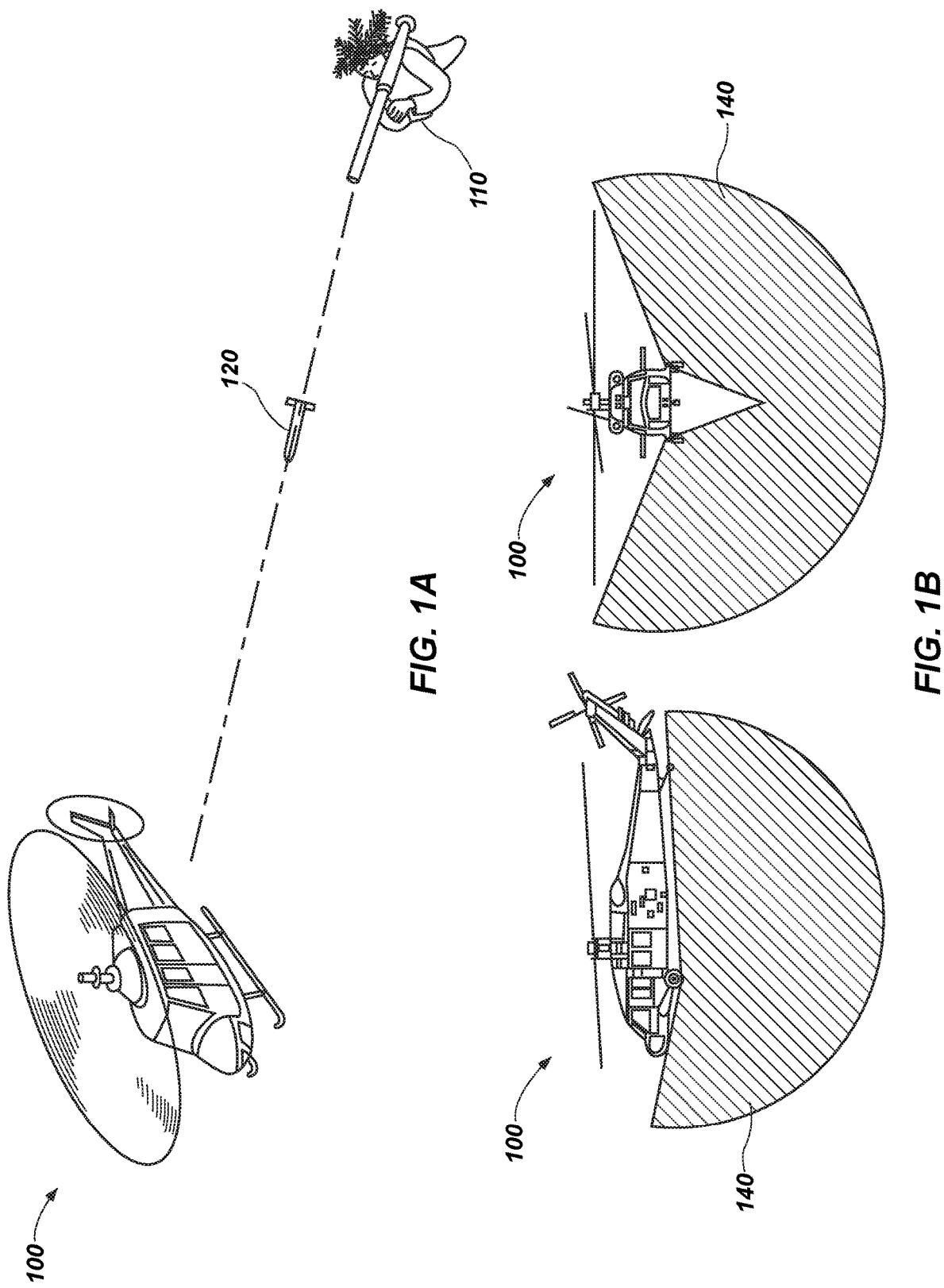

Acquisition Mode Track While Scan (TWS)

Pulse Doppler Waveform

TDD Packet Structure

METHODS AND APPARATUSES FOR ENGAGEMENT MANAGEMENT OF AERIAL THREATS

CROSS-REFERENCE TO RELATED APPLICATIONS

This application is a continuation of U.S. patent application Ser. No. 15/355,839, filed Nov. 18, 2016, pending, which is a continuation of U.S. patent application Ser. No. 13/839,176, filed Mar. 15, 2013, now U.S. Pat. No. 9,501,055, issued Nov. 22, 2016, which is a continuation-in-part of U.S. patent application Ser. No. 13/455,831, filed Apr. 25, 2012, now U.S. Pat. No. 9,170,070, issued Oct. 27, 2015, which claims priority to U.S. Provisional Patent Application Ser. No. 61/606,010, filed Mar. 2, 2012. This application also claims priority to U.S. Provisional Patent Application Ser. No. 61/736,440, filed Dec. 12, 2012. The disclosure of each of these applications is hereby incorporated by reference in its entirety. This application is also related to U.S. patent application Ser. No. 13/839,637, filed Mar. 15, 2013, now U.S. Pat. No. 9,551,552, issued Jan. 24, 2017.

TECHNICAL FIELD

Embodiments of the present disclosure relate generally to methods and apparatuses for engagement management relative to a threat and, more particularly, to engagement management relative to aerial threats.

BACKGROUND

Rocket-propelled grenades (RPGs) and other human carried projectiles such as—man-portable air-defense systems (MANPADS or MPADS) and shoulder-launched surface-to-air missiles (SAMs) represent serious threats to mobile land and aerial platforms. Even inexperienced RPG operators can engage a stationary target effectively from 150-300 meters, while experienced users could kill a target at up to 500 meters, and moving targets at 300 meters. One known way of protecting a platform against RPGs is often referred to as active protection and generally causes explosion or discharge of a warhead on the RPG at a safe distance away from the threatened platform. Other known protection approaches against RPGs and short range missiles are more passive and generally employ fitting the platform to be protected with armor (e.g., reactive armor, hybrid armor or slat armor).

Active protection systems (APS) have been proposed for ground vehicles for defense against RPGs and other rocket fired devices with a good success rate for quite some time. However, these systems are proposed to protect vehicles that are: 1) armored, 2) can carry heavy loads, and 3) have plenty of available space for incorporation of large critical systems. Currently these systems can weigh anywhere between 300 to 3000 lbs. and can protect the vehicle when intercepting incoming threats as close as 5 to 10 ft.

There is a need in the art for engagement management systems that can work in cooperation with intercept vehicles to engage and destroy aerial threats. There is also a need for such systems to be portable and lightweight enough for carrying on aerial and other mobile platforms that may have significant weight and size constraints, or on which an active protection system may be easily installed. There is also a need for such systems to coordinate with multiple engagements of aerial threats, intercept vehicles, and other nearby engagement management systems.

BRIEF DESCRIPTION OF THE DRAWINGS

FIGS. 1A and 1B illustrate a helicopter as an aerial platform that may be under attack from an aerial threat and coverage areas that may be employed to sense when such a threat is present;

DETAILED DESCRIPTION

Figure 2A:
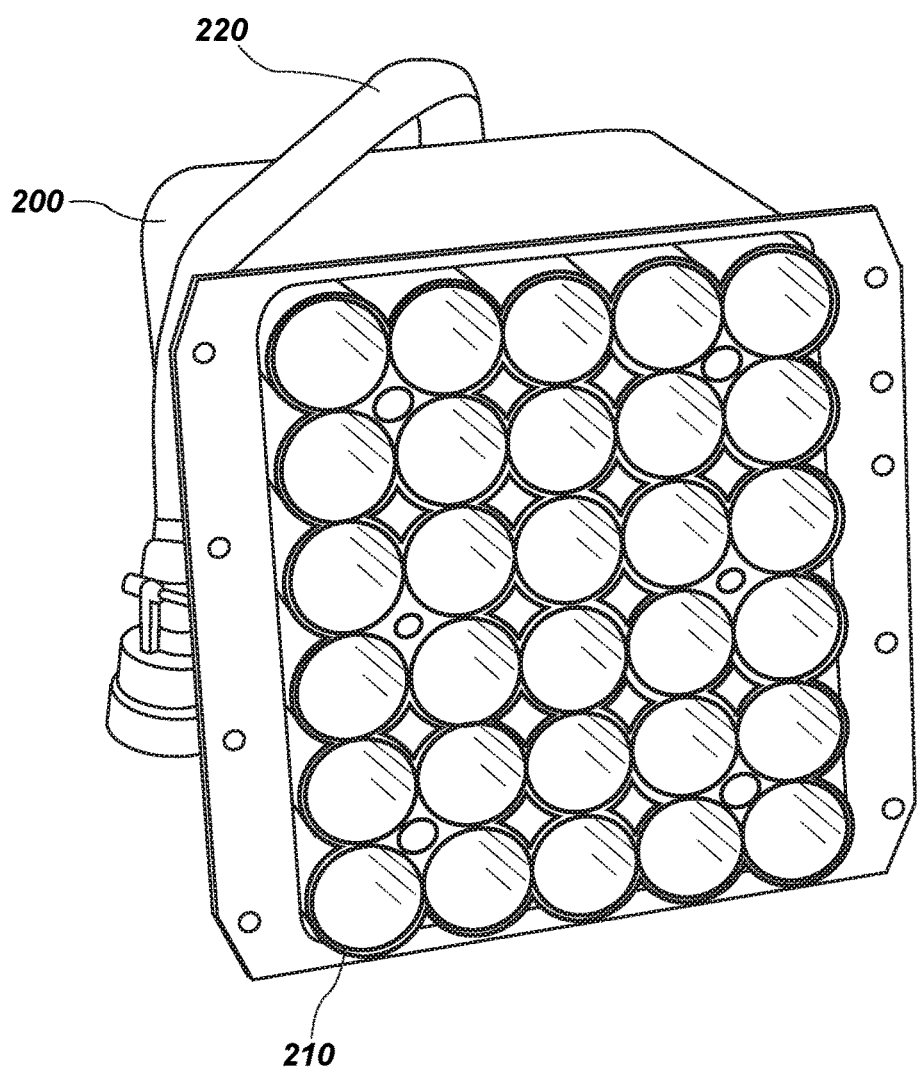
FIGS. 2A and 2B illustrate a conventional dispenser in which an eject vehicle (EV) according to one or more embodiments of the present disclosure may be placed.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
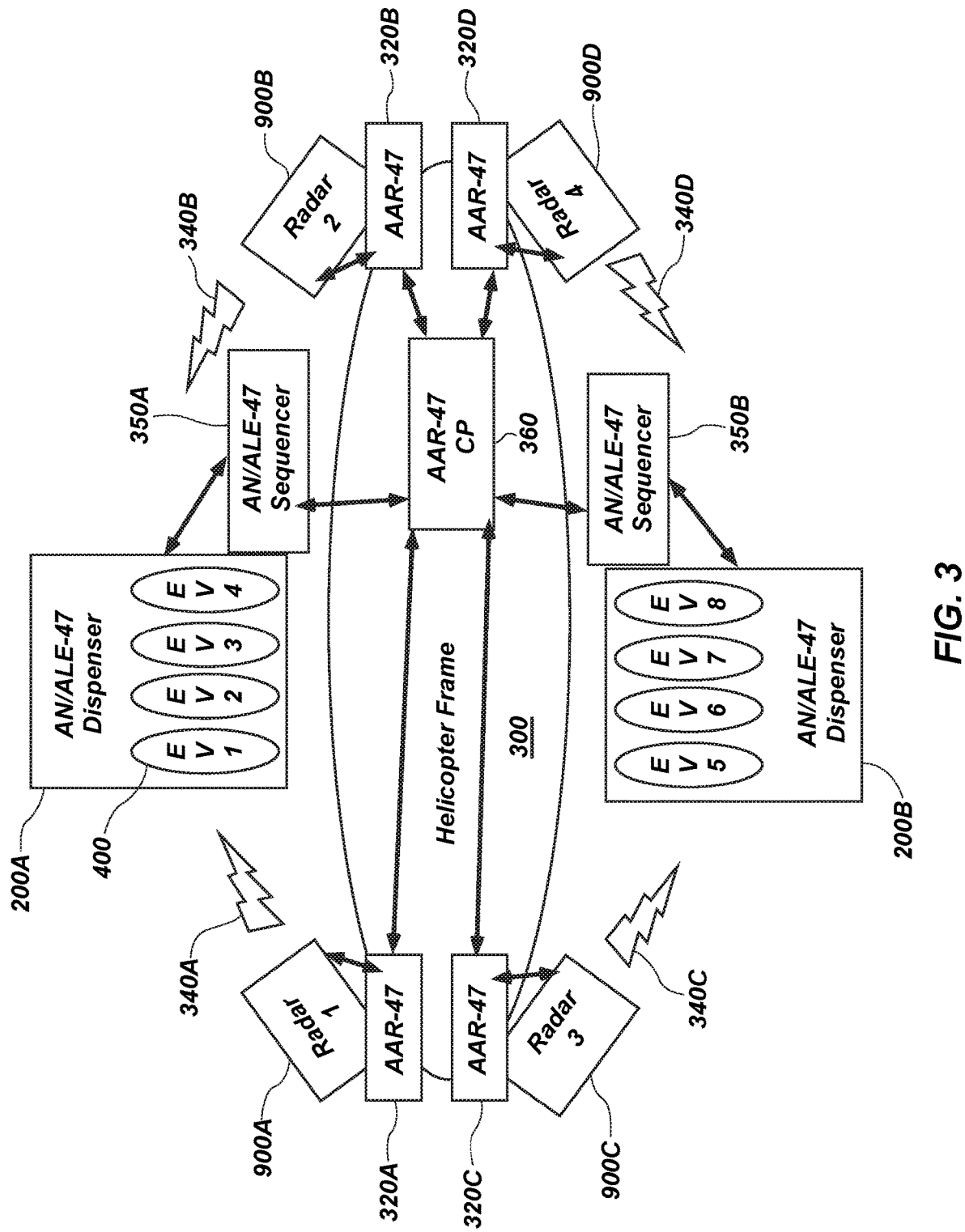
FIG. 3 illustrates systems that may be present on a helicopter and that may intercommunicate according to one or more embodiments of the present disclosure.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include apparatuses and methods for providing protection for mobile platforms, such as, for example, a helicopter, from an aerial threat. Some embodiments of the present disclosure may include methods and apparatuses that are portable and lightweight enough for carrying on aerial platforms that may have significant weight and size constraints. Some embodiments of the present disclosure may include methods and apparatuses that can be incorporated into existing systems already installed on aerial platforms.

FIGS. 1A and 1B illustrate a helicopter as an aerial platform 100 that may be under attack from an aerial threat 120 and coverage areas 140 that may be employed to sense when such a threat is present within an intercept range (may also be referred to herein as a threat range) of embodiments of the present disclosure. As shown in FIG. 1A, the aerial threat 120 may be shot by an attacker 110 toward the aerial platform 100.

As used herein, "aerial threat" or "threat" are used interchangeably to refer to any threat directed toward a mobile platform, including projectiles, rockets, and missiles that may be shoulder launched or launched from other platforms. As non-limiting examples, such aerial threats include rocket-propelled grenades (RPGs),—man-portable air-defense systems (MANPADS or MPADS), shoulder-launched surface-to-air missiles (SAMs),—tube-launched, optically tracked, wire-guided missiles (TOWs), and other aerial weapons, having a trajectory and ordnance such that they may cause damage to the mobile platform.

The term "aerial platform" includes, but is not limited to, platforms such as helicopters, unmanned airborne vehicles (UAVs), remotely piloted vehicles (RPVs), light aircraft, hovering platforms, and low speed traveling platforms. The protection systems and methods of the present disclosure are particularly useful for protecting aerial platforms against many kinds of aerial threats.

While embodiments of the present disclosure may be particularly suitable for use on aerial platforms 100 due to the small size and weight, they may also be used in other types of mobile platforms like ground-based mobile platforms such as, for example, tanks, armored personnel carriers, personnel carriers (e.g., Humvee and Stryker vehicles) and other mobile platforms capable of bearing embodiments of the present disclosure. Moreover, embodiments of the present disclosure may be used for relatively stationary ground-based personnel protection wherein a mobile platform may not be involved. Accordingly, embodiments of the disclosure are not limited to aerial applications.

FIG. 1B illustrates coverage areas 140 in which one or more embodiments of the present disclosure may detect an incoming aerial threat 120 and perform active countermeasures using one or more embodiments of the present invention to remove the aerial threat 120 before it can damage the aerial platform 100. Some embodiments of the present disclosure may be configured such that they can be disposed in previously existing countermeasures dispenser systems (CMDS).

Figure 2B:
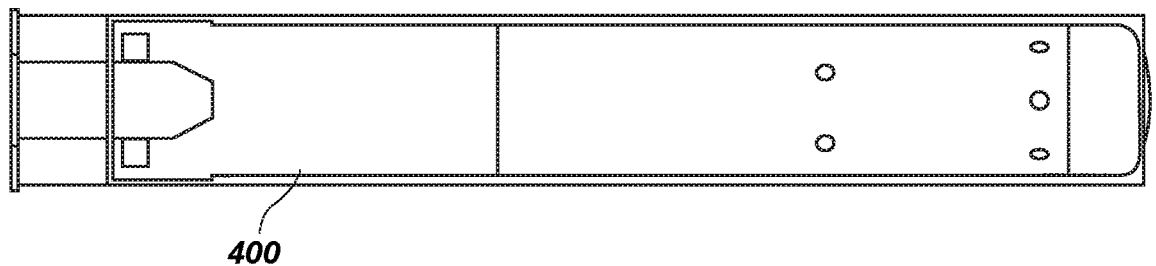

FIGS. 2A and 2B illustrate a dispenser 200 configured as a conventional CMDS (e.g., an AN/ALE-47) in which an eject vehicle 400 (EV) according to one or more embodiments of the present disclosure may be placed. AN/ALE-47 dispensers are conventionally used to dispense passive countermeasures, such as, for example, radar-reflecting chaff, infrared countermeasures to confuse heat-seeking missile guidance, and disposable radar transmitters. With some embodiments of the present disclosure, eject vehicles 400 may also be placed in the AN/ALE-47 and ejected therefrom under control of the AN/ALE-47 and other electronics on the aerial platform 100 (FIGS. 1A and 1B). The eject vehicle 400 may be configured as a substantially cylindrical vehicle to be placed in a tubular dispenser 210 and ejection may be controlled from control wiring 220 connected to the dispenser 200. Moreover, the dispenser 200 may be configured to hold both the passive countermeasures for which it was originally designed, as well as one or more eject vehicles 400 according to embodiments of the present disclosure.

While some embodiments of the eject vehicle 400 may be configured to be disposed in an AN/ALE-47, other types of dispensers 200 or other types of carriers for the eject vehicle 400 may also be used. Moreover, the tubular dispenser 210 is illustrated with a circular cross-section. However, other cross-sections may be used, such as, for example, square, hexagonal, or octagonal.

FIG. 3 illustrates systems that may be present on a helicopter frame 300 and that may intercommunicate according to one or more embodiments of the present disclosure. The helicopter frame 300 and systems described are used as specific examples to assist in giving details about embodiments of the present disclosure. In the specific example of FIG. 3, an AAR-47 missile approach warning system (MAWS) warns of threat missile approaches by detecting radiation associated with the missile. In the specific example, four MAWSs (320A, 320B, 320C, and 320D) are disposed near four corners of the helicopter frame 300. A central processor 360 may be used to control and coordinate the four MAWSs (320A, 320B, 320C, and 320D).

Two AN/ALE-47 dispensers (200A and 200B) are positioned on outboard sides of the helicopter frame 300, each of which may contain one or more eject vehicles 400. As shown in FIG. 3, there are four eject vehicles 400 on each side labeled EV1 through EV4 on one side and labeled EV5-EV8 on the other side. The AN/ALE-47 dispensers (200A and 200B) are each controlled by an AN/ALE-47 sequencer (350A and 350B), which are, in turn, controlled by the central processor 360.

According to one or more embodiments of the present disclosure four radar modules (900A, 900B, 900C, and 900D) are included to augment and connect with the AAR-47s and communicate with the eject vehicles 400. These radar modules 900 (see FIG. 9A) are configured to detect and track relatively small incoming aerial threats (e.g., an RPG) as well as the outgoing eject vehicles 400. Moreover, the radar modules 900 can send wireless communications (340A, 340B, 340C, and 340D) to the eject vehicles 400 both before and after they are ejected from the dispensers (200A and 200B). The radar modules 900, and eject vehicles 400 may each include unique identifiers, such as, for example, a media access control (MAC) address. The radar modules 900 may also be configured to detect, track, and communicate with other friendly platforms such as, for example, other helicopters flying in formation with the helicopter. Thus, all helicopters within communication range can communicate and share radar and control information to form a broad coverage area, similar to cellular telephone base station coverage. Moreover, and as explained more fully below, the helicopters may communicate to define different sector coverage areas such that one helicopter does not launch an eject vehicle 400 into a sector that may damage or interfere with another helicopter.

The control processors, such as the central processor 360, the MAWSs 320, the radar modules 900, the sequencers 350, and the dispensers 200 may be configured to form an ad hoc network and include the eject vehicles 400.

The specific example of FIG. 3 is shown to illustrate how radar modules (900A-900D) and eject vehicles (EV1-EV8) of the present disclosure can be incorporated with existing systems on helicopter platforms with little change. Of course, other systems may be employed with embodiments of the present disclosure. As a non-limiting example, one radar module 900A may be positioned on one side of the helicopter frame 300 and another radar module 900C may be positioned on another side of the helicopter frame. In such a case, the radar modules 900 would be configured to provide hemispherical coverage areas. These radar modules 900 may be controlled by, communicate with, or a combination thereof, a different central processor 360 configured specifically for embodiments of the present disclosure. Moreover, the eject vehicles 400 may be disposed in different carriers or different dispensers from the AN/ALE-47 dispensers (200A and 200B) shown in FIG. 3.

When embodiments of the present disclosure are used as illustrated in FIG. 3, they provide an ultra-lightweight active protection system for helicopter platforms that may increase the survivability against RPG attacks to better than 90% for RPGs fired from ranges as close as about 100 meters away.

In order to satisfy the helicopter platform constraints, embodiments of the present disclosure address many significant technology areas:

1) For helicopter applications, size, weight, and power should be considered. Every pound of added airframe equipment will reduce capacity to carry personnel or cargo, and the space for adding equipment to the airframe may be at a premium. At least some embodiments of the present disclosure are configured to be less than about 50 pounds and occupy about 5.5"×5.5" surface area at each of the four corners of a helicopter exterior shell and with minimal impact to existing wiring kits.

2) Helicopters generally do not carry armor and thus, the intercept of an incoming threat (e.g., an RPG) must occur at a range that is safe to the un-armored helicopter airframe. Using an RPG-7 as an example, to achieve a survival probability of about 99% from the blast alone, the intercept should occur at distances beyond 30 meters from the helicopter shell. This requirement significantly influences the system response time, when considering that an RPG fired at a 100-meter distance may impact the helicopter in less than about 600 milliseconds.

3) A third concern is fratricide and collateral damage to friendly forces that may be amplified by the helicopter platform deploying kinetic countermeasures in a position above ground and potentially next to a wingman helicopter or in the vicinity of civilians, friendly troops, or a combination thereof. Some embodiments of the present disclosure are configured to work in combination with embodiments on other helicopters when the helicopters are flying in formation relatively close to each other.

4) Some embodiments of the present disclosure can geo-locate the attacker 110 (FIG. 1A) after few radar track frames are processed.

5) Embodiments of the present disclosure can engage multiple threats at a time. In other words, multiple incoming aerial threats 120 can be detected and tracked and multiple outgoing eject vehicles 400 can be tracked. In addition, to increase a probability of destroying an incoming aerial threat 120, multiple eject vehicles 400 may be launched, directed toward, and detonated proximate the same aerial threat 120.

6) Finally, eject vehicles 400 can be launched and guided to the point of attack with the same or different warheads and detonated above the threat point of origin.

To address these technology areas, some embodiments of the present disclosure include an active kinetic countermeasure projectile (i.e., the eject vehicle 400 of FIG. 2B), including an ejection mechanism with an impulse charge that can fit in, and can be launched by, the AN/ALE-47 chaff/flare dispenser 200. Some embodiments of the present disclosure include the radar module 900 covering a 90 degree sector or more (i.e., with a 90 degree sector, each helicopter platform would use four radar modules 900).

When referring to the radar module 900 herein (e.g., as shown in FIG. 3), it should be understood that in some embodiments the radar module 900 may perform the operations described herein in combination with other electronics and processors on the aerial platform 100. As such, the radar modules 900 may be used to: 1) search, acquire, and track incoming aerial threats 120, 2) launch the active kinetic countermeasure (i.e., eject vehicle 400), 3) track the outgoing eject vehicle 400 with respect to the incoming aerial threat 120, 4) point and guide the eject vehicle 400 toward the incoming aerial threat 120, 5) command detonate the eject vehicle 400, and 6) geo-locate the attacker 110, all in less than about one second. In one configuration, at least two AN/ALE-47 dispensers 200 would be used in conjunction with the four radar modules 900 such that each dispenser 200 provides hemispherical coverage.

The radar modules 900 may be configured as pulse Doppler radar modules 900 to scan the azimuth plane and the elevation plane using two orthogonal fan beams and may be configured to cover a 90 degree sector in about 20 milliseconds. Upon detecting an incoming aerial threat 120, the associated radar module 900 may then direct the launch and guidance of an eject vehicle 400 from an AN/ALE-47 dispenser 200 that covers that sector. The eject vehicle 400 may be command guided to the target by the radar module 900 and command detonated. The radar modules 900 may be configured as an addition to the existing AN/AAR-47 system and may use its existing interface for launching of the eject vehicle 400.

Some of the embodiments of the present disclosure may be configured to deploy an eject vehicle 400 that fits in a standard dispenser 200 but could be stabilized and pointed toward the threat after launch, in less than about 50 milliseconds, in the rotor downwash of a helicopter, and when ejected in the fixed direction dictated by the dispenser 200. The radar modules 900 may then guide the eject vehicle 400 to accurately intercept the aerial threat 120 within about 330 milliseconds and thus reduce the requirement of carrying a large warhead.

Figure 4:
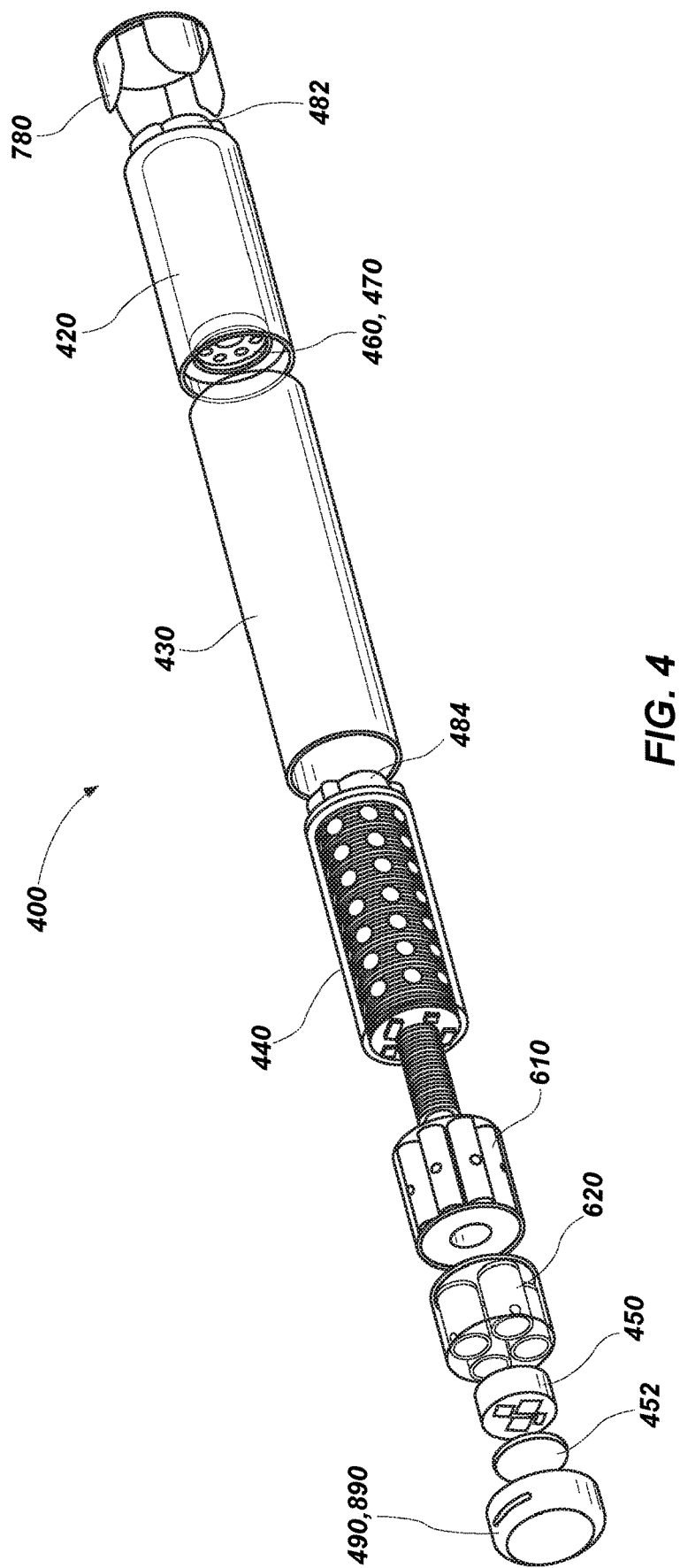
FIG. 4 illustrates an exploded view of an eject vehicle showing various elements of the EV according to one or more embodiments of the present disclosure.

FIG. 4 illustrates an exploded view of an eject vehicle 400 showing various elements of the eject vehicle 400 according to one or more embodiments of the present disclosure. Reference may also be made to FIGS. 1A-3 in describing features and operations of the eject vehicle 400. The eject vehicle 400 is a lightweight guided projectile that, in some embodiments, may be designed to be launched from chaff/flare dispensers. The eject vehicle 400 may intercept and destroy incoming aerial threats 120 at ranges sufficient to prevent damage to the host aerial platform 100. The eject vehicle 400 may be packaged in a cartridge containing an impulse charge and interface electronics designed to fit the AN/ALE-47 dispenser magazine.

The eject vehicle 400 includes an ejection piston 780 configured to transmit the energy of an impulse cartridge 750 (described below in connection with FIG. 7) to the eject vehicle 400 and launch the eject vehicle 400 away from the aerial platform 100 to a distance safe enough for the eject vehicle 400 to begin performing alignment and interception maneuvers.

A rocket motor 420 may be used to propel the eject vehicle 400 toward the aerial threat 120 after the eject vehicle 400 has been rotated such that a longitudinal axis of the eject vehicle 400 is pointed in the general direction of the aerial threat 120. A first set of folding fins 482 may be attached to the rocket motor 420 and configured to deploy once the eject vehicle 400 has exited the dispenser 200. The folding fins 482 are small and configured to provide stability to the eject vehicle 400 during its flight path rather than as control surfaces for directing the fight path.

An airframe shell 430 may be configured to contain a warhead 440, a divert thruster module 610, a nose thruster module 620 (may also be referred to herein as an alignment thruster module 620), an electronics module 450, and a battery 452. An airframe nose 490 may be configured to attach to the airframe shell 430 to protect the electronics module 450 and provide a somewhat aerodynamic nose for the eject vehicle 400.

A safe and arm module 460 may be included within the airframe shell 430 and configured to safely arm the warhead 440 when the eject vehicle 400 is a safe distance away from the aerial platform 100.

Figure 5A:
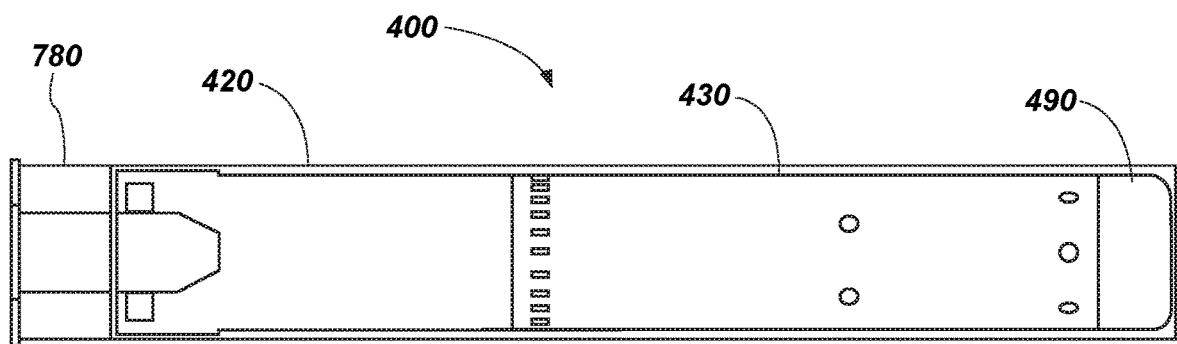
FIGS. 5A-5C illustrate the eject vehicle of FIG. 4 as it may be configured during various stages of an intercept mission according to one or more embodiments of the present disclosure.
Figure 5B:
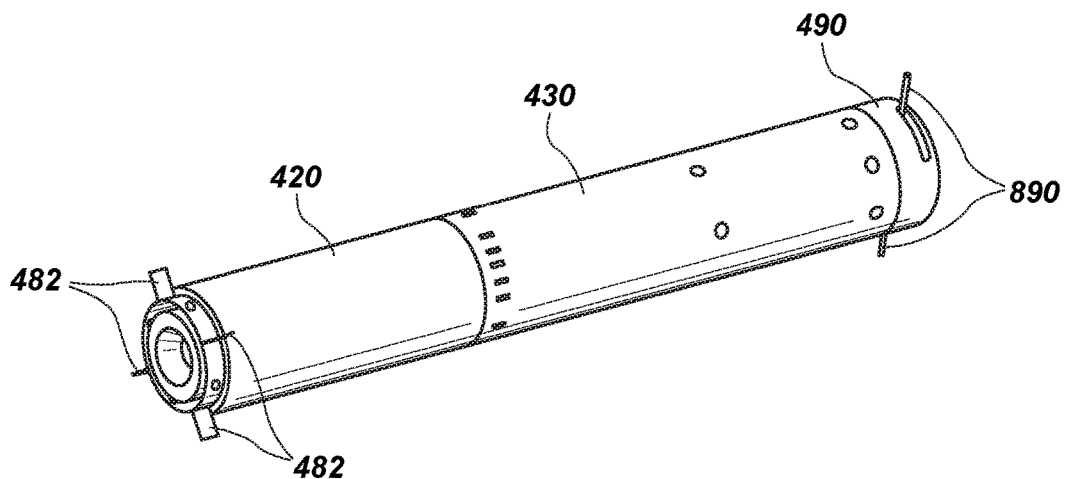
Figure 5C:
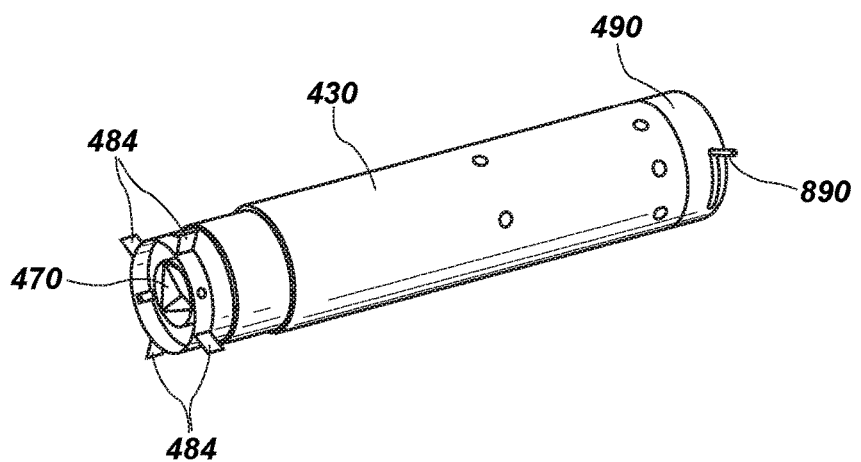

FIGS. 5A-5C illustrate the eject vehicle 400 of FIG. 4 as it may be configured during various stages of an intercept mission according to one or more embodiments of the present disclosure. Stage 1, in FIG. 5A, illustrates the eject vehicle 400 in a cartridge 710 (FIG. 7) and includes the ejection piston 780, the rocket motor 420, the airframe shell 430, and the airframe nose 490.

Stage 2, in FIG. 5B, illustrates the eject vehicle 400 after it has been dispensed and shows the rocket motor 420, the airframe shell 430, and the airframe nose 490. FIG. 5B also illustrates the folding fins 482 deployed near the end of the rocket motor 420 and wireless communication antennas 890 deployed near the airframe nose 490.

Stage 3, in FIG. 5C illustrates the eject vehicle 400 after the rocket motor 420 has burned and been detached from the airframe shell 430. At this stage, the eject vehicle 400 may be referred to as a terminal vehicle and includes the airframe nose 490, the wireless communication antennas 890, and the airframe shell 430. Still within the airframe shell 430 are the warhead 440, the divert thruster module 610, the alignment thruster module 620, the electronics module 450, the battery 452, and the safe and arm module 460. After the rocket motor 420 is detached, a second set of folding fins 484 are deployed from the airframe shell 430 to stabilize the eject vehicle 400 during the remainder of the flight to intercept the aerial threat 120. This second set of folding fins 484 are used to replace the first set of folding fins 482 that were attached to the rocket motor 420, which has been detached from the airframe shell 430 during stage 3.

In addition, after the rocket motor 420 is detached, one or more corner reflectors 470 are exposed. The corner reflector 470 may be configured with sharp angles to enhance radar detection of the eject vehicle 400 by a radar module 900 on the aerial platform 100. For example, the corner reflector 470 may be configured as an interior angle of a small cube shape, which will enhance radar detection.

Returning to FIG. 4, the alignment thruster module 620 is offset from a center of mass of the eject vehicle 400 such that an initial pitch maneuver can be performed to align the longitudinal axis of the eject vehicle 400 along an intercept vector pointed toward the aerial threat 120. This alignment maneuver is performed prior to the burn of the rocket motor 420.

The divert thruster module 610 is positioned substantially near a center of mass of the terminal vehicle and is used to laterally divert the terminal vehicle from its current flight path to make minor corrections to the flight path in order to more accurately intercept the aerial threat 120. The terminal vehicle may be referred to herein as the eject vehicle 400 and it should be understood what is being referred to based on the context of the discussion.

The warhead 440 may be command detonated when the radar module 900 on the aerial platform 100 determines that the eject vehicle 400 has reached the closest point of approach (nominally about 15 cm). The use of thrusters, provide the fast reaction times that may be needed to intercept the aerial threat 120 at a nominal distance of about 50 meters when the aerial threat 120 is launched from a range of about 100 meters.

Figure 6A:
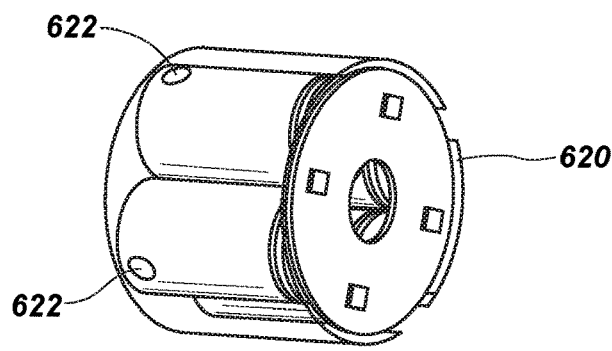
FIGS. 6A-6C illustrate various propulsion and thruster elements that may be included with one or more embodiments of the present disclosure.
Figure 6B:
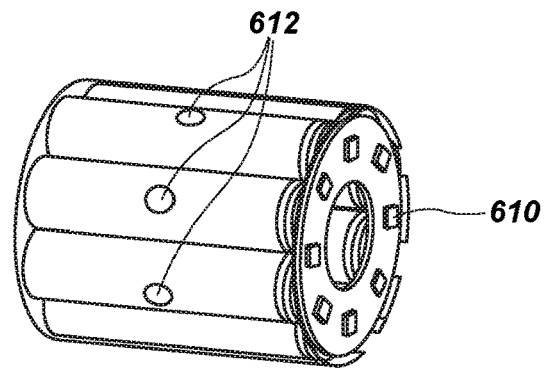
Figure 6C:
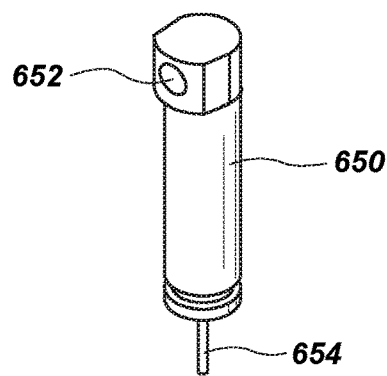

FIGS. 6A-6C illustrate various propulsion and thruster elements that may be included with one or more embodiments of the present disclosure. FIG. 6A illustrates a nose thruster module 620 with four nose thrusters 622 (two are hidden) arranged around a periphery of the nose thruster module 620. These nose thrusters 622 (also referred to herein as alignment thrusters 622) are positioned to generate a perpendicular force on the eject vehicle 400 (FIG. 4) relative to the longitudinal axis and are offset from the center of mass of the eject vehicle 400 so that an initial pitch maneuver can be performed to rotate and align the longitudinal axis of the eject vehicle 400 along an intercept vector pointed toward the aerial threat 120. In this embodiment, the four nose thrusters 622 are orthogonally arranged giving two opportunities to adjust the pitch of the eject vehicle 400 in each direction. Of course, other embodiments may include fewer or more alignment thrusters 622.

FIG. 6B illustrates a divert thruster module 610 with eight divert thrusters 612 (five are hidden) arranged around a periphery of the divert thruster module 610. These divert thrusters 612 are positioned to generate a perpendicular force on the eject vehicle 400 relative to the longitudinal axis and are positioned near the center of mass of the eject vehicle 400 so that the divert thrusters 612 will move the eject vehicle 400 laterally to a slightly different travel path, while substantially maintaining the same pitch. Thus, the divert thrusters 612 can modify the flight path of the eject vehicle 400 to correct for minor errors in the initial pitch maneuvers pointing directly toward the aerial threat 120. In this embodiment, eight divert thrusters 612 are used giving eight opportunities to adjust the flight path of the eject vehicle 400 during its flight toward the aerial threat 120. Of course, other embodiments may include fewer or more divert thrusters 612.

FIG. 6C illustrates a thruster 650 configured to expel a gas through a nozzle 652 to create a lateral force. The thruster 650 may be controlled from a thrust signal 654, which may be connected to the electronics module 450 of the eject vehicle 400 (FIG. 4). The thruster 650 is one example of a type of thruster that may be used for both the divert thrusters 612 and the alignment thrusters 622.

Figure 7:
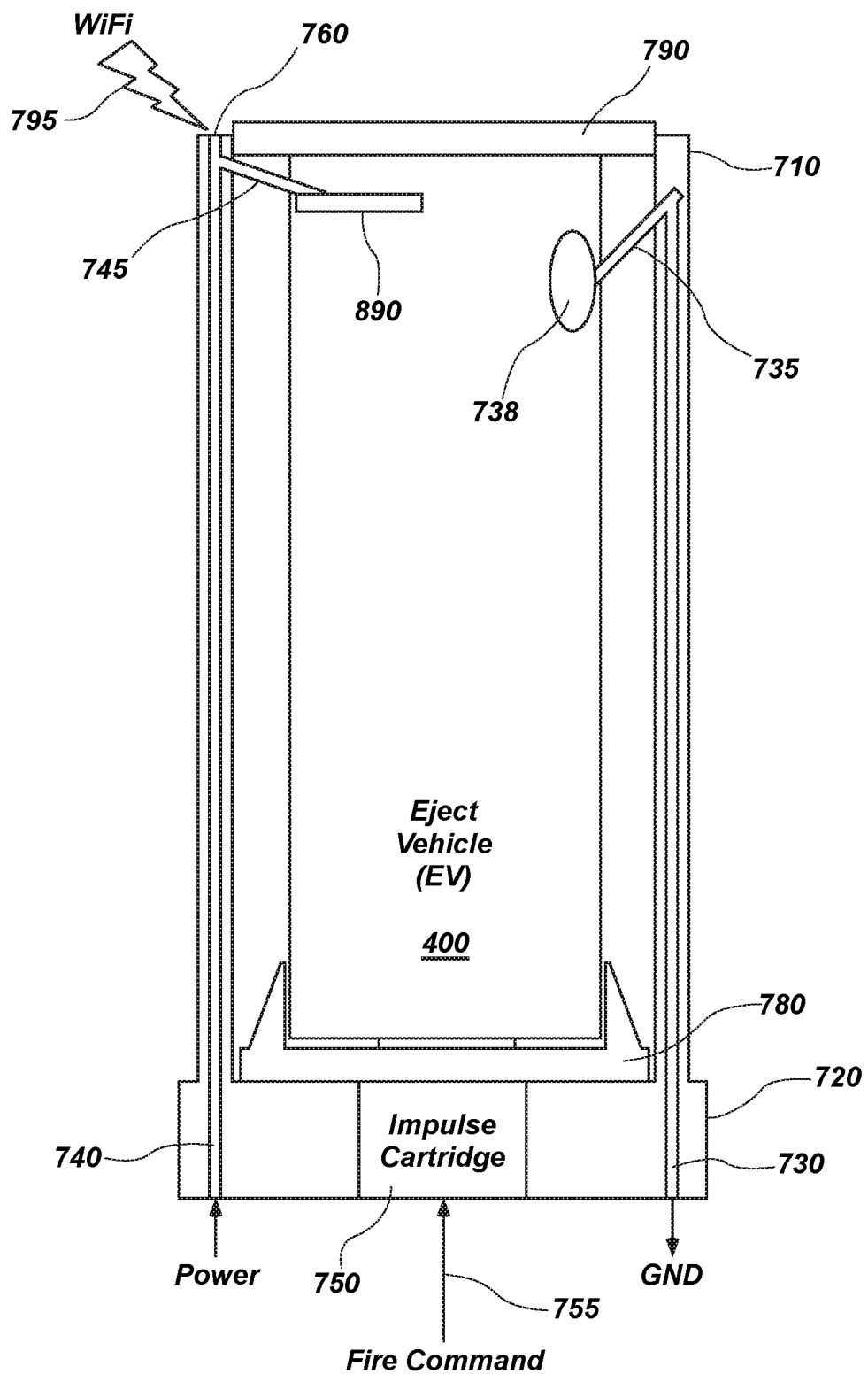
FIG. 7 illustrates various electrical and communication connections that may be present on an EV while it is disposed on the mobile platform prior to launch.

FIG. 7 illustrates various electrical and communication connections that may be present on the eject vehicle 400 while it is disposed on the aerial platform 100 (FIGS. 1A and 1B) prior to launch. A cartridge 710 includes a cartridge flange 720 such that the cartridge 710 may be securely placed in a dispenser 200 (FIG. 2A). An end cap 790 may be positioned over the cartridge 710 to hold the eject vehicle 400 within the cartridge 710. An impulse cartridge 750 is positioned near the base of the cartridge flange 720 and is configured to fire in response to a fire command signal 755 from the radar module 900 (FIG. 3) or other electronics on the aerial platform 100. An ejection piston 780 is positioned between the impulse cartridge 750 and the eject vehicle 400 and is configured to transmit the energy of the firing impulse cartridge 750 to the eject vehicle 400 and propel the eject vehicle 400 out of the dispenser 200 and safely away from the aerial platform 100.

A power signal 740 and a ground signal 730 may run along or through the cartridge to an antenna spring contact 745 and a ground spring contact 735, respectively. The ground spring contact 735 is configured to flexibly couple with a ground patch 738 on the eject vehicle 400 to provide a ground for the eject vehicle 400 electronics while the eject vehicle 400 is in the cartridge 710. The antenna spring contact 745 is configured to flexibly couple with the antenna 890 on the eject vehicle 400 and a power signal on the eject vehicle 400 to provide power and direct communication for the eject vehicle 400 electronics while the eject vehicle 400 is in the cartridge 710. The cartridge 710 may include a cartridge antenna 760 that may be coupled to the antenna 890 of the eject vehicle 400 by the antenna spring contact 745. Thus, the eject vehicle 400 may communicate wirelessly 795 with electronics onboard the aerial platform 100 through the antenna 890 on the eject vehicle 400 or through the cartridge antenna 760.

Figure 8:
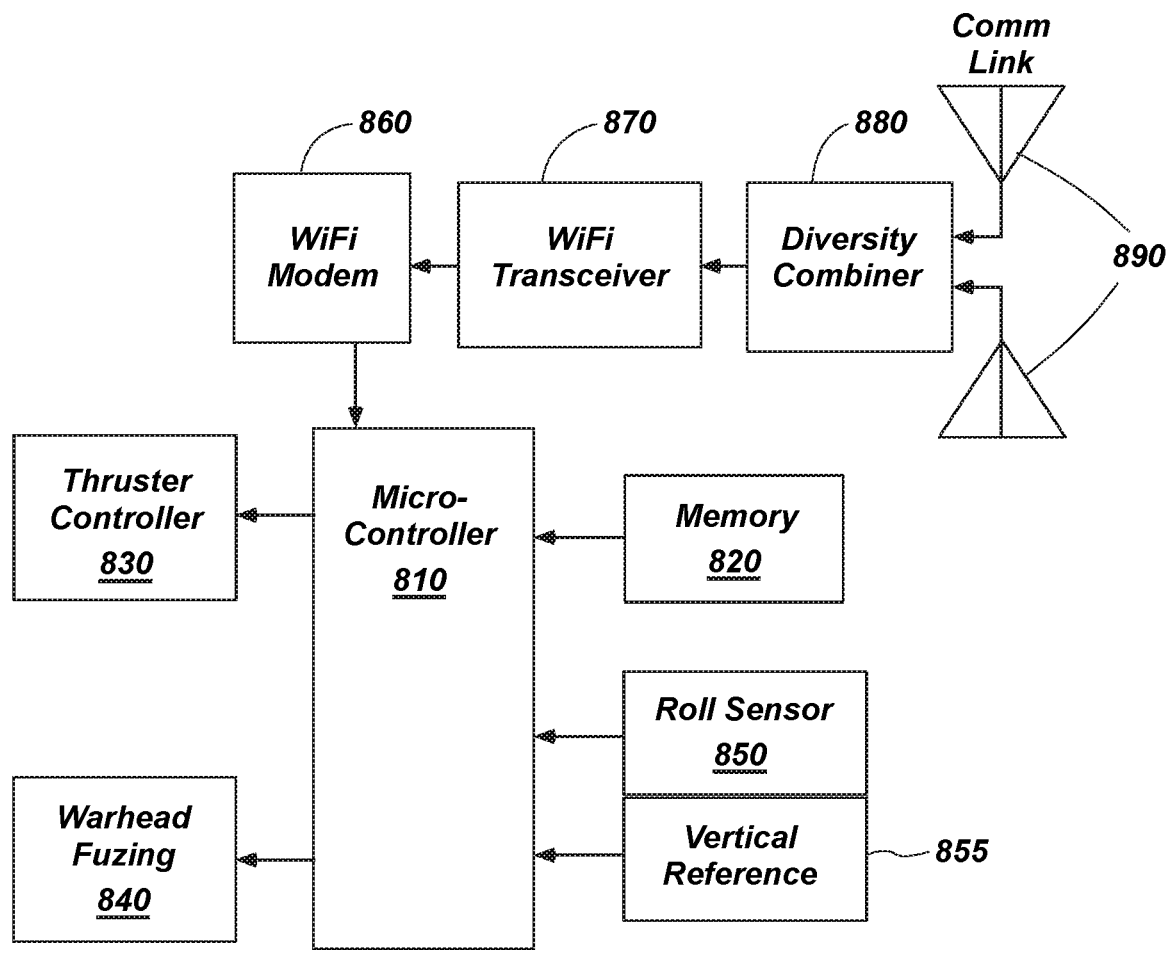
FIG. 8 is a block diagram illustrating elements that may be present on the eject vehicle according to one or more embodiments of the present disclosure.

FIG. 8 is a block diagram illustrating elements that may be present on the eject vehicle 400 according to one or more embodiments of the present disclosure. A microcontroller 810 may be coupled to a memory 820, which is configured to hold instructions for execution by the microcontroller 810 and data related to command and control of the eject vehicle 400. The microcontroller 810 may be any suitable microcontroller, microprocessor, or custom logic configured to directly execute, or execute responsive to software instructions, processes related to operation of the eject vehicle 400. The memory 820 may be any suitable combination of volatile and non-volatile memory configured to hold data and computing instructions related to operation of the eject vehicle 400.

One or more antennas 890 may be configured to provide a communication link with electronics (e.g., the radar module 900) onboard the aerial platform 100. As non-limiting examples, the communication link may be configured using WiFi or WiMax frequencies and protocols. A diversity combiner 880 may be used to combine signals from multiple antennas.

A communication transceiver 870 (e.g., a WiFi transceiver) may be coupled to the diversity combiner 880 and be configured to transmit and receive frequencies to and from the diversity combiner 880. A communication modem 860 (e.g., a WiFi modem) may be coupled to the communication transceiver 870 and be configured to package and modulate communication information for communication transmission as well as demodulate and extract information from communication reception. The microcontroller 810 receives information from the communication modem 860 and may perform operations related to the received information. In addition, based on processes performed on the microcontroller 810, information may be sent to the communication modem 860 for transmission through the one or more antennas 890.

The microcontroller 810 may be coupled to a thrust controller 830, which interfaces with the alignment thrusters 622 and the divert thrusters 612 (FIG. 6). A warhead fuzing interface 840 may be provided to interface to the warhead 440 (FIG. 4), the safe and arm module 460 (FIG. 4) or a combination thereof, for arming and control of detonation of the warhead 440.

A roll sensor 850 and a vertical reference 855 may be used in combination to determine the attitude of the eject vehicle 400 as well as a spin rate and spin position of the eject vehicle 400 and communicate such information to the microcontroller 810. Other types of sensors, such as, for example, accelerometers and magnetometers may also be used for this purpose.

Figure 9A:
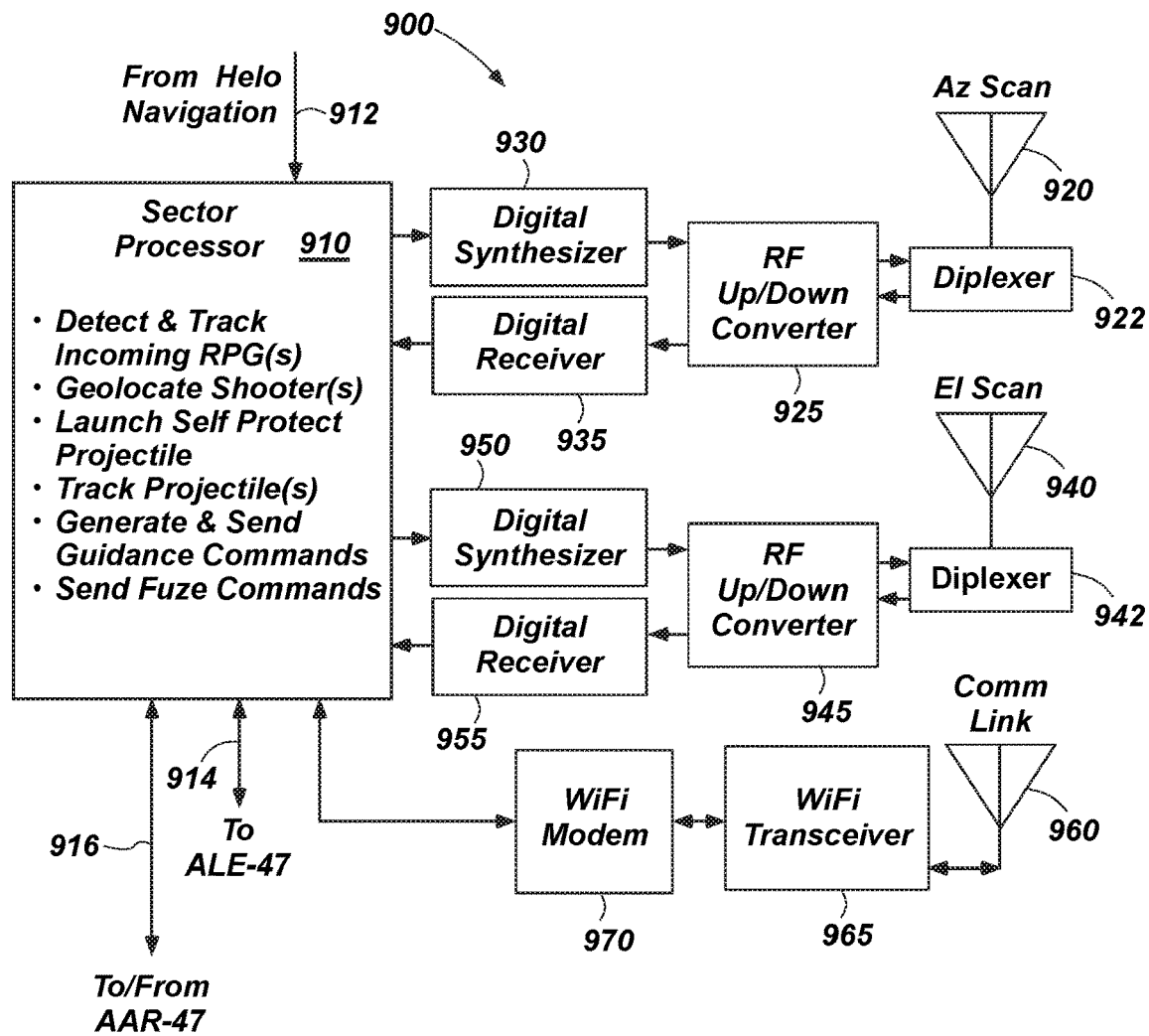
FIG. 9A is a block diagram illustrating elements that may be present on the aerial platform according to one or more embodiments of the present disclosure.
Figure 9B:
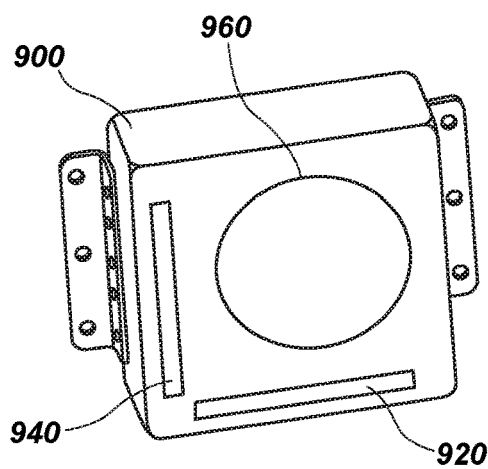
FIG. 9B is a perspective view of a radar module that may be present on the aerial platform according to one or more embodiments of the present disclosure.

FIG. 9A is a block diagram illustrating elements that may be present on the aerial platform 100 according to one or more embodiments of the present disclosure. The electronics module and functions thereof on the aerial platform 100 may be contained within a radar module 900, as illustrated in FIG. 9B. Alternatively, some of the function may be within the radar module 900 while other functions may be located in different places on the aerial platform 100 such as, for example, the central processor 360 (FIG. 3). The various modules used to control the radar module 900 and the eject vehicle 400 and determine other information related thereto may be collectively referred to herein as an "onboard system."

FIG. 9B is perspective view of the radar module 900 that may be present on the aerial platform 100 according to one or more embodiments of the present disclosure. The radar module 900 includes an azimuth scan radar antenna 920, an elevation scan radar antenna 940, and a wireless communication link antenna 960.

The azimuth scan radar antenna 920 is included in an azimuth radar subsystem, which includes a diplexer 922 for combining radar sent and reflected radar received. A radio frequency (RF) up/down converter 925 converts the radar frequencies sent from a digital synthesizer 930 and converts the radar frequencies received for use by a digital receiver 935.

The elevation scan radar antenna 940 is included in an elevation radar subsystem similar to the azimuth radar subsystem, but configured for the elevation direction. The elevation radar subsystem includes a diplexer 942 for combining radar sent and reflected radar received. A radio frequency (RF) up/down converter 945 converts the radar frequencies sent from a digital synthesizer 950 and converts the radar frequencies received for use by a digital receiver 955.

The wireless communication link antenna 960 may be configured to provide a communication link with electronics onboard the eject vehicle 400. As non-limiting examples, the communication link may be configured using WiFi or WiMax frequencies and protocols. A wireless communication subsystem includes a communication transceiver 965 (e.g., a WiFi transceiver) coupled to the wireless communication link antenna 960 and configured to transmit and receive frequencies to and from the wireless communication link antenna 960. A communication modem 970 (e.g., a WiFi modem) may be coupled to the communication transceiver 965 and be configured to package and modulate communication information for communication transmission as well as demodulate and extract information from communication reception.

A sector processor 910 communicates with the elevation radar subsystem, the azimuth radar subsystem, and the wireless communication subsystem. The sector processor 910 may communicate helicopter navigation information 912 from other electronics on the aerial platform 100. Referring also to FIG. 3, the sector processor 910 may also communicate with the dispenser 200 (e.g., one or more ALE-47s) using communication signal 914 and the missile approach warning system 320 (e.g., one or more AAR-47s) using communication signal 916. The sector processor 910 performs a number of functions to detect and track aerial threats 120, control and track the eject vehicle 400, as well as other functions related to the active protection system. In some embodiments, communication between the dispenser 200 and the sector processor 910 may be accomplished through the missile approach warning system 320.

The sector processor 910 in combination with the radar subsystems can detect and track incoming aerial threats 120 (e.g., RPGs). Based on the tracking of the incoming aerial threat, and in combination with navigation information from the aerial platform, the sector processor 910 can extrapolate to a geo-location of the attacker 110, from where the aerial threat 120 was launched. The aerial platform 100 may act on this geo-location or transmit the geo-location to other aerial platforms or ground-based platforms for follow-up actions.

The sector processor 910 may be configured to send launch commands to the dispenser 200 on communication signal 914 to launch one or more eject vehicles 400 to intercept one or more detected aerial threats 120. The sector processor 910 may also calculate required pitch adjustments that should be performed by the eject vehicle 400 after it has been ejected and is safely away from the aerial platform 100.

Once the eject vehicle 400 is launched, the sector processor 910 may be configured to track the eject vehicle 400 and send guidance commands (i.e., divert commands) to the eject vehicle 400 so the eject vehicle 400 can perform divert maneuvers to adjust its flight path toward the aerial threat 120. The sector processor 910 may also be configured to determine when the eject vehicle 400 will be near enough to the aerial threat 120 to destroy the aerial threat 120 by detonation of the warhead 440 on the eject vehicle 400. Thus, a detonation command may be sent to the eject vehicle 400 instructing it to detonate, or instructing it to detonate at a detonation time after receiving the command.

Figure 10A:
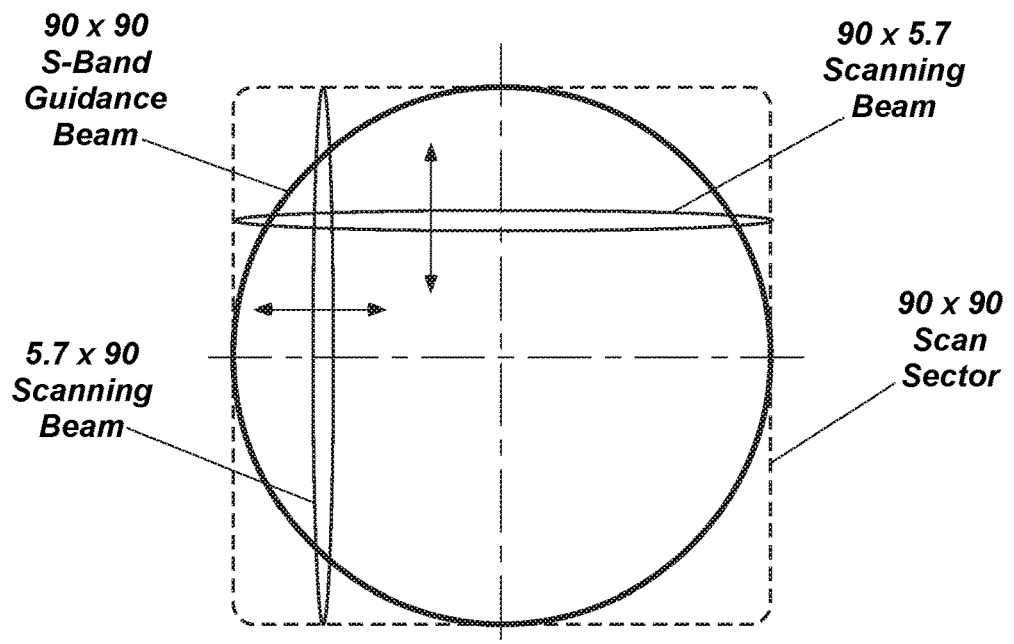
FIGS. 10A and 10B are diagrams illustrating radar scanning beams during an acquisition mode and a tracking mode, respectively.
Figure 10B:
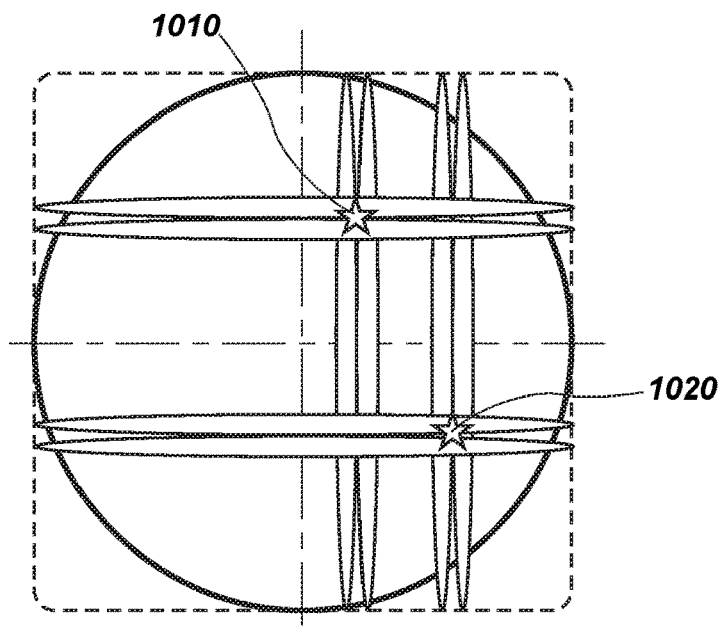

FIGS. 10A and 10B are diagrams illustrating radar scanning beams during an acquisition mode and a tracking mode, respectively. Referring to FIGS. 10A, 10B, 9, and 3, the radar modules 900 may be mounted in close proximity to the existing AN/ALR-47 missile warning receiver (MWR) installations to provide 360 degrees spatial coverage while minimizing wiring modifications to the helicopter. It is anticipated that an aerial threat 120 will be launched at relatively short ranges, typically on the order of 100 m. The radar modules 900 are designed to detect and track the low radar cross-section (typically −15 dBsm) of an RPG fired from any aspect angle, within 30 milliseconds of launch, and out to a range of at least 300 meters. The radars operate in the Ka-Band to minimize the antenna size yet provide the precision angular measurements needed to guide the eject vehicle 400 to intercept the aerial threat 120. A high pulse-repetition-frequency pulse Doppler waveform provides radial velocity measurements as well as the clutter rejection needed to operate in close proximity to the ground while detecting low radar cross-section targets. Pulse compression may be used to achieve precision range measurements as well as increasing the transmit duty cycle to best utilize the capabilities of existing Ka-Band solid-state power amplifiers. The antennas generate a pair of orthogonal fan beams, providing a continuous track-while-scan capability to minimize detection latency and provide multiple target track capability. Beam scanning can be accomplished using a frequency scan method to eliminate the need for expensive phase shifters.

FIG. 10A illustrates an acquisition mode wherein an elevation radar generates an elevation fan beam extending in the vertical direction that sweeps in the horizontal direction and an azimuth radar generates an azimuth fan beam extending in the horizontal direction that sweeps in the vertical direction. Thus, an entire 90-degree scan sector can be covered by the radar systems to quickly detect and acquire an incoming aerial threat 120 when it is within range.

FIG. 10B illustrates a track mode. In FIG. 10B, two sequential azimuth scans and two sequential elevation scans are shown that pinpoint a first location 1010 of the eject vehicle 400. In addition, two sequential azimuth scans and two sequential elevation scans are shown that pinpoint a second location 1020 of the aerial threat 120. With this location information, the sector processor 910 can derive relative position information that can be used to provide divert commands to the eject vehicle 400 to more closely intercept the aerial threat 120.

Figure 11:
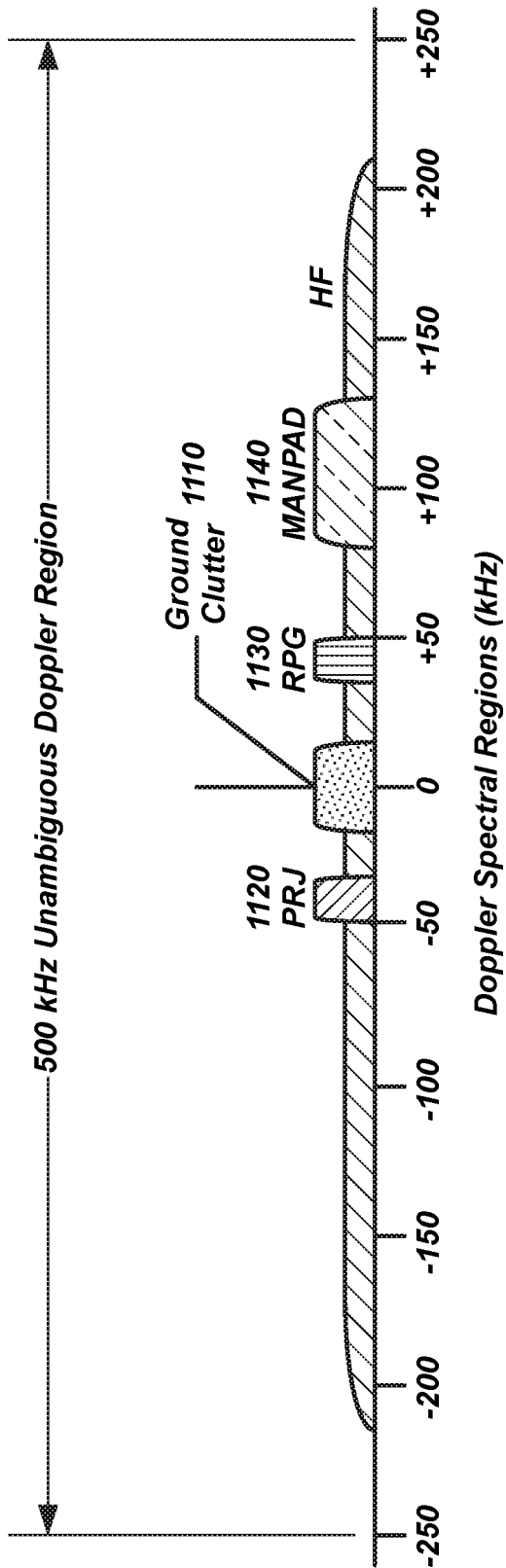
FIG. 11 is a spectrum diagram illustrating possible Doppler spectrum regions where various aerial vehicles may be detected.

FIG. 11 is a spectrum diagram illustrating possible Doppler spectrum regions where various aerial vehicles may be detected. As non-limiting examples, FIG. 11 illustrates a ground clutter spectrum 1110, a spectrum 1120 for the eject vehicle 400 (i.e., PRJ in FIG. 11), a spectrum 1130 that may be indicative of an RPG, and a spectrum 1140 that may be indicative of a MANPAD. Of course, other aerial threats and their associated spectrums may also be identified.

Figure 12:
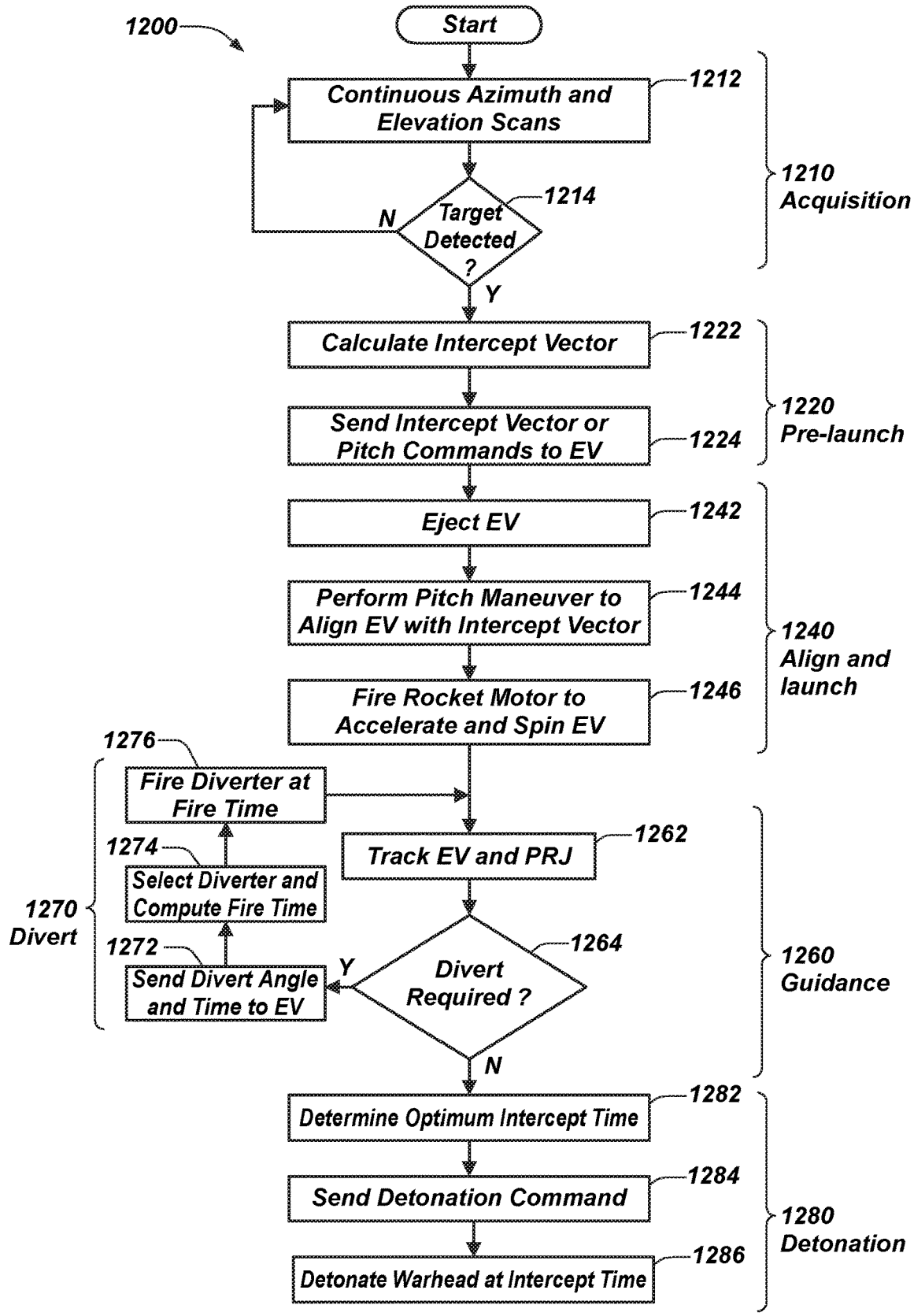
FIG. 12 is a simplified flow diagram illustrating some of the processes involved in one or more embodiments of the present disclosure.

FIG. 12 is a simplified flow diagram illustrating some of the processes 1200 involved in one or more embodiments of the present disclosure. The processes may be loosely considered as an acquisition phase 1210, a pre-launch phase 1220, an align and launch phase 1240, a guidance phase 1260, a divert phase 1270, and a detonation phase 1280.

Operation block 1212 indicates that continuous radar scans are performed looking for incoming aerial threats. Decision block 1214 indicates that the process loops until a target is detected. While not shown, during this phase the radar modules 900 may also be detecting distance and angle to wingman platforms (i.e., other aerial platforms) in the vicinity. Using communication between the various wingman platforms, sectors of responsibility can be identified as discussed more fully below in connection with FIG. 14.

If a target is detected, the process 1200 enters the pre-launch phase 1220. Operation block 1222 indicates that the sector processor 910 uses the range and travel direction of the incoming aerial threat 120 to calculate a threat direction to the incoming aerial threat 120 and an intercept vector pointing from a deployed eject vehicle 400 to a projected intercept point where the eject vehicle 400 would intercept the incoming aerial threat 120. Operation block 1224 indicates that the intercept vector is sent to the eject vehicle 400. The intercept vector may be sent to the eject vehicle 400 in a number of forms. The actual directional coordinates may be sent and the eject vehicle 400 would be responsible for determining the proper pitch maneuvers to perform. Alternatively, the sector processor 910 may determine the proper pitch maneuvers that the eject vehicle 400 should perform after launch and send only pitch commands (e.g., start and burn times for each alignment thruster 622) to be used during the pitch maneuvers. While FIG. 12 indicates that the intercept vector or pitch commands are sent before launch, some embodiments may be configured such that this information can be sent after launch.

During the acquisition phase 1210 and pre-launch phase 1220, the eject vehicle 400 remains in the dispenser 200 and connected to power. An RF communication link may be in operation through the eject vehicle 400 antenna via a transmission line inside the dispenser 200.

The process enters the align and launch phase 1240 after the intercept vector is determined. Operation block 1242 indicates the impulse cartridge 750 is fired to propel the eject vehicle 400 from the dispenser 200 and safely away from the aerial platform 100.

Operation block 1244 indicates that the pitch maneuvers are performed to align the eject vehicle 400 with the already determined intercept vector. The pitch maneuver is a two-stage process that sequentially executes an azimuth rotation and an elevation rotation to align the longitudinal axis of the eject vehicle 400 along the intercept vector. The pitch maneuver does not have to be exact. As a non-limiting example, offsets of up to about 10 to 15 degrees may be corrected during flight of the eject vehicle 400 using the divert thrusters 612 during the guidance phase 1260. After ejection, the folding fins 482 will deploy and the communication link antennas 890 will deploy and wireless communication between the eject vehicle 400 and the radar module 900 may commence.

Operation block 1246 indicates that the rocket motor 420 will fire, which accelerates the eject vehicle 400 to about 160 meters/second and imposes a spin rate on the eject vehicle 400 of about 10 Hertz. Upon exhaustion, the rocket motor 420 and folding fins 482 will separate and the terminal vehicle (TV) is exposed. With separation of the TV, the second set of folding fins 484 deploy and the corner reflector 470 is exposed.

During the guidance phase 1260, the process will perform a track and divert loop in order to adjust the flight path of the eject vehicle 400 to more closely intercept the aerial threat 120. Operation block 1262 indicates that the sector processor 910 will track the eject vehicle 400 and aerial threat 120 as discussed above with reference to FIGS. 9A-10B. Decision block 1264, indicates that the sector processor 910 will determine if a divert maneuver is required to intercept the incoming aerial threat 120 and estimate the direction of divert thrust required.

A divert phase 1270 includes operations to cause the eject vehicle 400 to modify its course. Operation block 1272 indicates that the divert direction and time, if required, are sent to the eject vehicle 400.

The divert process takes into account the rotation of the eject vehicle 400 and the direction of the desired divert thrust. This rotation adds a complication to the selection and fire time determination of the proper divert thruster 612, but also ensures that all of the available divert thrusters 612 can be used to divert the eject vehicle 400 in any desired direction substantially perpendicular to the travel direction of the eject vehicle 400. Operation block 1274 indicates that the processor on the eject vehicle 400 will select the divert thruster to be fired and determine the firing time based on the divert angle received from the sector processor 910 and its internal attitude sensors.

Operation block 1276 indicates that the appropriate divert thruster 612 is fired at the appropriate fire time to move the eject vehicle 400 laterally along a diversion vector to adjust the flight path of the eject vehicle 400. As a non-limiting example, each divert thruster 612 may be capable of correcting for about two degrees of error from the initial pointing of the eject vehicle 400 during the pitch maneuver. Thus, when the divert thrusters 612 are fired when the eject vehicle 400 is in the correct rotational position, the process can slide the travel direction vector of the eject vehicle 400 toward the path of the aerial threat 120. Moreover, the process can fire in any circular direction and can fire multiple divert thrusters 612 in the same direction to repeatedly move the eject vehicle 400 in the same direction.

While FIG. 12 indicates the guidance phase 1260 and the detonation phase 1280 as operating sequentially, they also may operate in parallel. During the detonation phase 1280, operation block 1282 indicates that the sector processor 910 determines an optimum intercept time when the eject vehicle 400 will be at its closest point to the aerial threat 120. Operation block 1284 indicates that a detonation command may be sent to the eject vehicle 400. This detonation command may be in the form of a detonation time for the eject vehicle to count out or it may be in the form of an immediate command for the eject vehicle 400 to perform as soon as the command is received.

Operation block 1286 indicates that the warhead 440 on the eject vehicle 400 is detonated at the intercept time responsive to the detonation command received from the sector processor 910.

Figure 13:
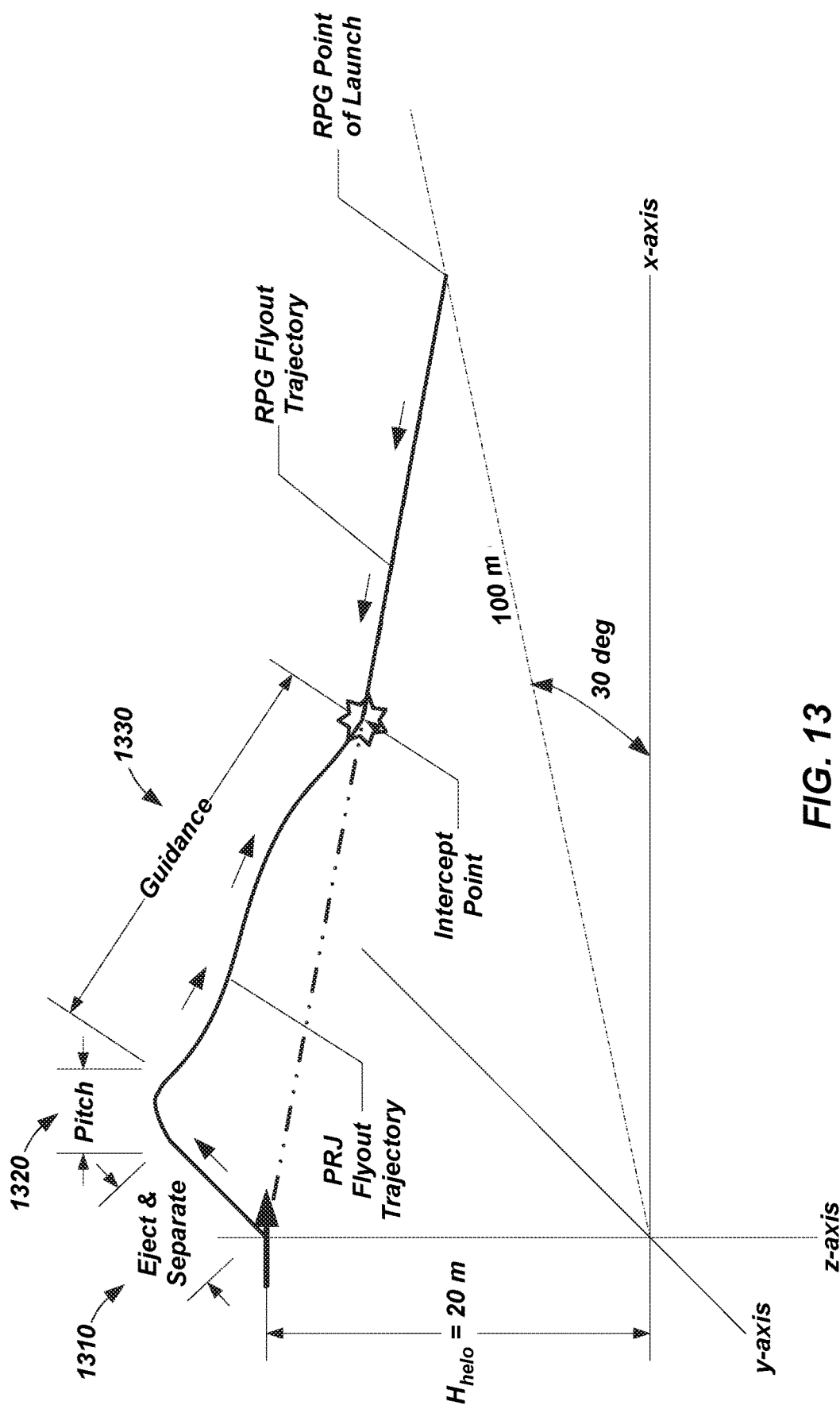
FIG. 13 illustrates an example flight path for the eject vehicle and an aerial threat during an intercept process.

FIG. 13 illustrates an example flight path for the eject vehicle 400 and an aerial threat 120 during an intercept process. In this example, a typical RPG and EV trajectory example are shown. The RPG is launched at a range of about 100 meters and 30 degrees left of the nose of the helicopter. The eject vehicle 400 receives its coordinate commands from the radar module 900 and is then ejected from the port chaff dispenser 200 at an angle of 90 degrees to the helicopter axis.

During period 1310, the eject vehicle 400 separates to a distance of about two meters from the helicopter. During period 1320, the nose thrusters pitch the eject vehicle 400 to the approximate approach angle of the incoming RPG (e.g., within about ±10° accuracy). The rocket motor 420 then fires to accelerate the eject vehicle 400 to approximately 160 meters/second and is then separated from the remaining terminal vehicle upon exhaustion.

During period 1330, the radar module 900 transmits a series of divert commands to the eject vehicle 400, which fires the divert thrusters 612 to correct the trajectory of the eject vehicle 400 and intercept the RPG. A radar command is finally sent to the eject vehicle 400 to detonate the warhead 440 when the terminal vehicle reaches the closest point of approach (CPA). The guidance algorithm may be configured to produce a maximum CPA of about 30 centimeters, which is well within the lethal 0.6-meter kill radius of the warhead 440.

Figure 14:
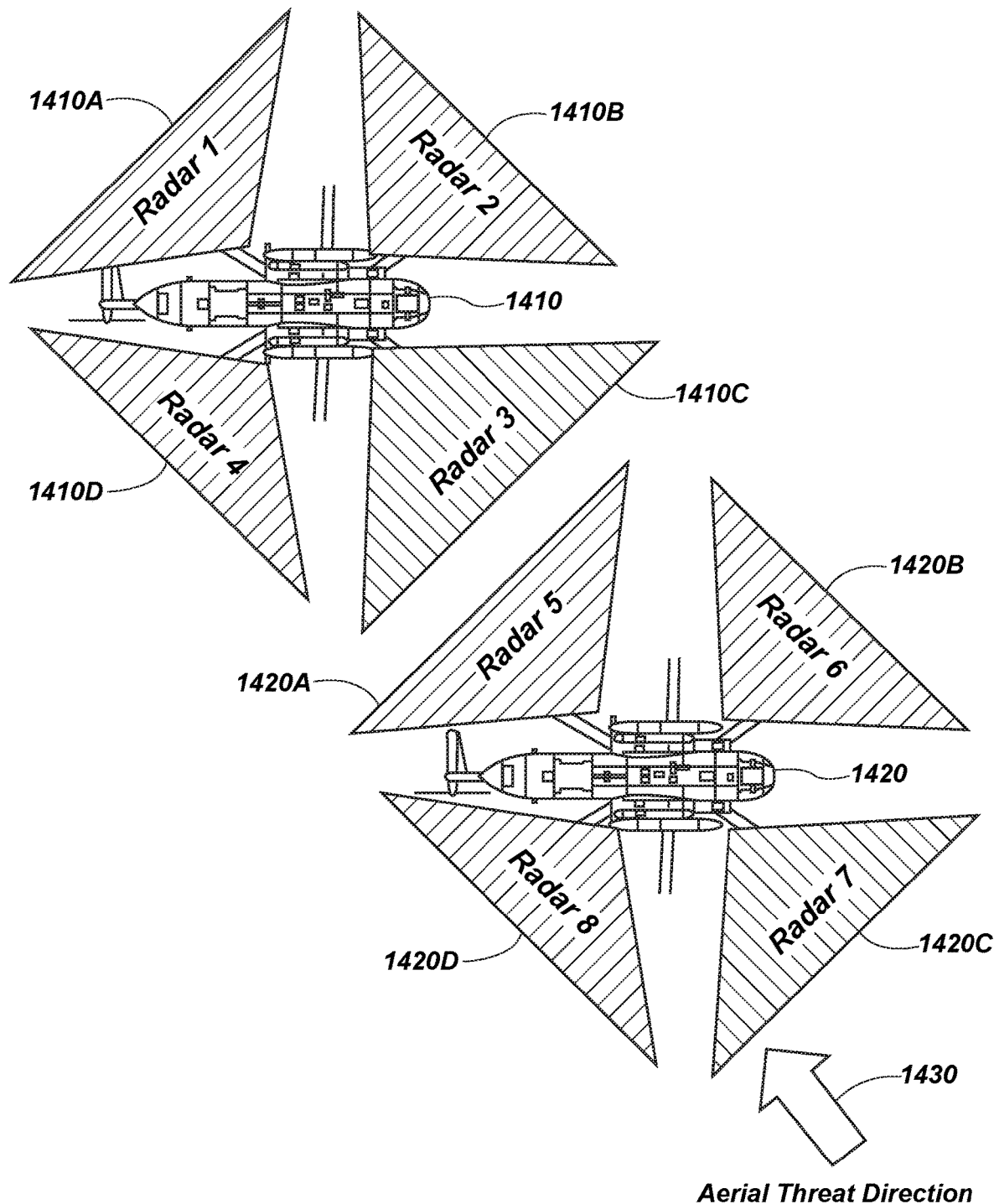
FIG. 14 illustrates two aerial vehicles flying in a formation and various radar sectors that may be covered by the aerial vehicles.

FIG. 14 illustrates two aerial vehicles flying in a formation and various radar sectors that may be covered by the aerial vehicles. A significant concern is the presence of wingman helicopters and the potential damage caused by accidental targeting. The system presented has capability of tracking and recognizing the adjacent helicopters and networking with their associated active protection systems to avoid collateral damage by handing off sectors covered by other platforms. In FIG. 14, a first helicopter 1410 is monitoring a first radar sector 1410A, a second radar sector 1410B, a third radar sector 1410C, and a fourth radar sector 1410D.

A second helicopter 1420 near the first helicopter 1410 is monitoring a fifth radar sector 1420A, a sixth radar sector 1420B, a seventh radar sector 1420C, and an eighth radar sector 1420D. If an aerial threat approaches from a direction indicated by arrow 1430 it may be detected by the third radar sector 1410C of the first helicopter 1410 and the seventh radar sector 1420C of the second helicopter 1420. If the first helicopter 1410 attempts to launch an eject vehicle, it may cause damage to the second helicopter 1420. However, using communication between the various wingman platforms, sectors of responsibility can be identified. Thus, for the direction indicated by arrow 1430, the first helicopter 1410 can determine that the third radar sector 1410C will be covered by the seventh radar sector 1420C of the second helicopter 1420. As a result, while this formation continues, the first helicopter 1410 does not respond to threats in its third radar sector 1410C.

Returning to FIG. 9B, the radar module 900 may also be referred to herein more generically as an engagement management module (EMM) 900. As discussed above, in some embodiments, an aerial platform 100 (FIGS. 1A and 1B) may be configured with four engagement management modules 900, an example of which is shown in FIG. 3.

The engagement management modules 900 may be used as part of a helicopter active protection system (HAPS), but may also be used in other types of aerial vehicles, ground vehicles, water vehicles, and stationary deployments. In one embodiment, the engagement management module 900 may be configured with a width of about 5.5 inches, a height of about 5.5 inches, and a depth of about 3.0 inches. The wireless communication link antenna 960 may be configured as an S-Band antenna while the azimuth scan radar antenna 920 and elevation scan radar antenna 940 may be configured to operate at about 35 GHz.

Figure 15:
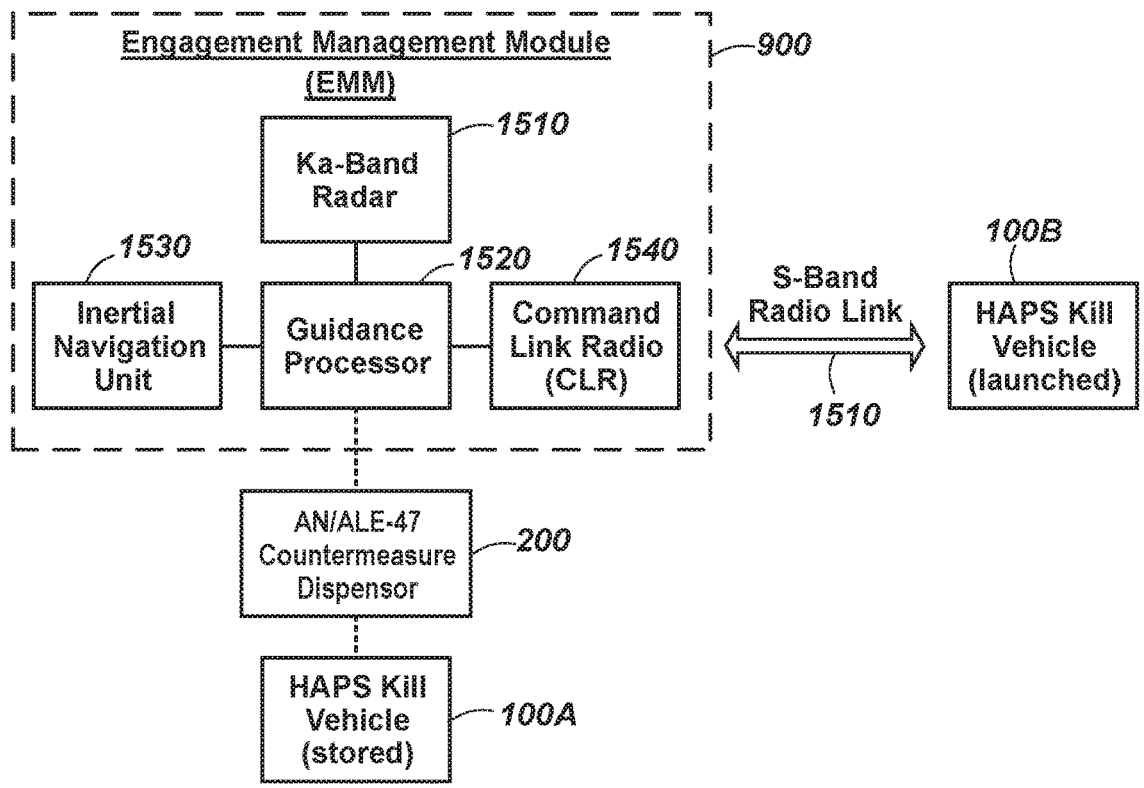
FIG. 15 illustrates a block diagram showing functional blocks of an embodiment of an engagement management module (EMM)

FIG. 15 illustrates a block diagram showing functional blocks of an embodiment of the engagement management module (EMM) 900. Each engagement management module 900 may include a Ka-band radar 1510, a guidance processor 1520, an inertial measurement unit ("IMU," may also be referred to as an inertial navigation unit) 1530, and an S-band command link radio (CLR) 1540. In some embodiments, an active laser may be used in place of the radar unit. In some embodiments, each EMM 900 may be configured to provide a quadrant sector coverage so four EMMs 900 can provide a full 360 degree coverage and protection.

FIG. 15 also illustrates an AN/ALE-47 dispenser 200 and an eject vehicle 100A (may also be referred to as a "kill vehicle" and a "HAPS kill vehicle"). Eject vehicle 100A is stored within the AN/ALE-47 dispenser 200 and another eject vehicle 100B is stored within dispenser 200 after eject vehicle 100A has been ejected. Each EMM 900 may be configured with a corresponding AN/ALE-47 dispenser 200 such that in systems with four EMMs 900, there may be four corresponding AN/ALE-47 dispensers 200. When stored in the AN/ALE-47 dispenser 200, the kill vehicle 100A may communicate through the AN/ALE-47 dispenser 200 with the EMM 900 and other systems on the aerial platform 100 such as the AAR-47 missile approach warning systems 320 shown in FIG. 3. When dispensed from the AN/ALE-47 dispenser 200, the kill vehicle 100B may communicate with the EMM 900 using an S-Band radio link 1510.

The EMM radar is a Ka-band active phased array utilizing a pulse Doppler waveform and a set of search and track mode pulse compression codes. An active phased array provides agile beam control to implement rapid search and acquisition functions along with the ability to track multiple targets within radar range and consistent with the short engagement timeline associated with the intercept of aerial threats 120 (FIG. 1A). The EMM radar also employs a unique set of orthogonal pulse compression waveforms that allows multiple radars to operate on the same carrier frequency without mutual interference. This arrangement conserves bandwidth allowing the four radars associated with one helicopter, plus those on nearby helicopters, to operate within an allocated frequency spectrum (in combination with different carrier frequencies) without interference.

Figure 16:
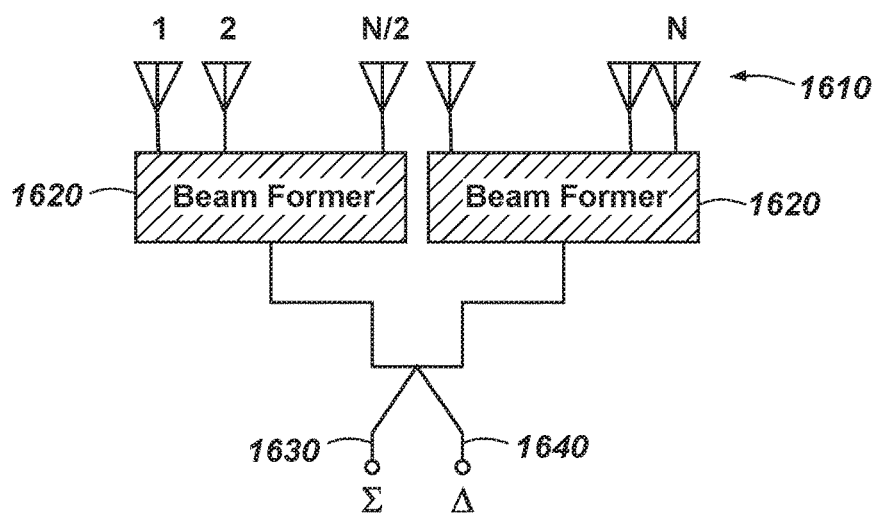
FIG. 16 illustrates an embodiment of EMM antennas as two orthogonal 32-element linear arrays.

FIG. 16 illustrates an embodiment of EMM antennas 1610 (1 through N=64) as two orthogonal 32-element linear arrays. The arrays are split into two halves and each driven by identical electronically steerable beamformers 1620. The two halves are combined to form a sum beam 1630, and a difference beam 1640.

Figure 17:
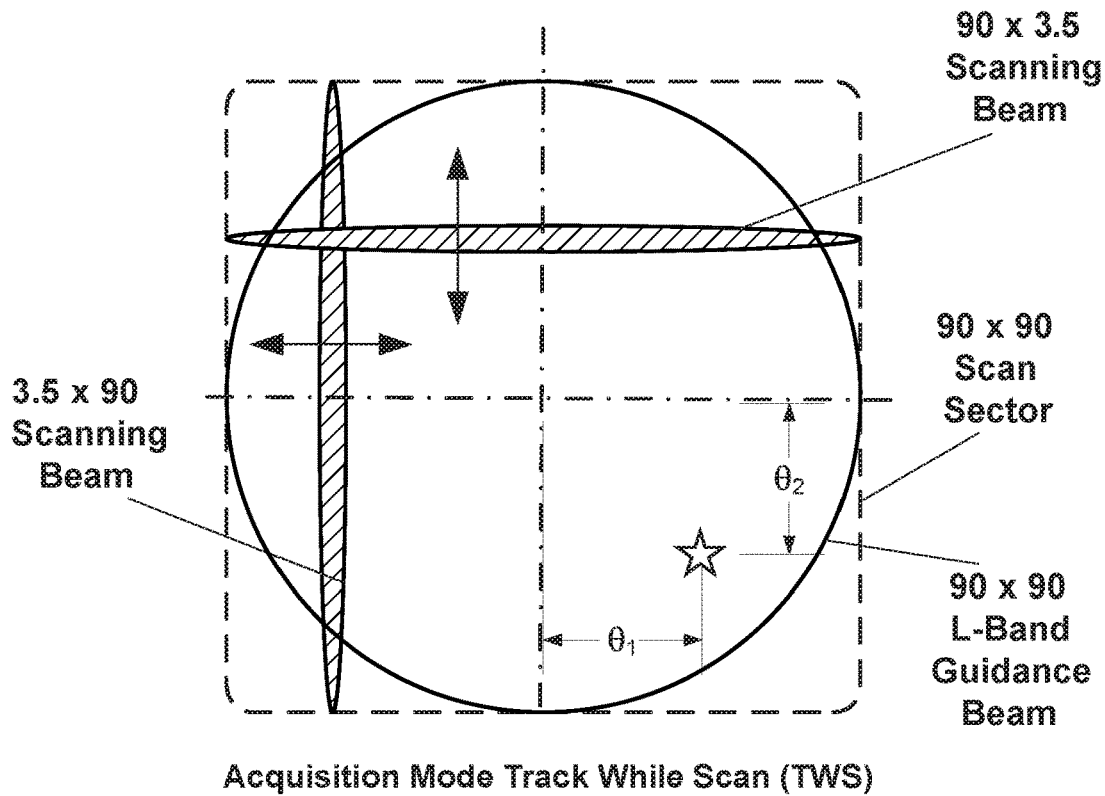
FIG. 17 illustrates orthogonal beams generated by the pair of orthogonal linear arrays illustrated in FIG. 16.

FIG. 17 illustrates orthogonal beams generated by the pair of orthogonal linear arrays 1610 illustrated in FIG. 16. The sum port of each antenna forms a fan shape that is nominally 3.5×90 degrees. Each beam can be scanned ±45 degrees to cover a full 90×90 degree quadrant. The difference port is used for monopulse tracking. FIG. 17 is similar to FIG. 10A except the beams are shown as 90×3.5 degree scanning beams rather than the 90-5.7 degree scanning beams of FIG. 10A.

Figure 18:
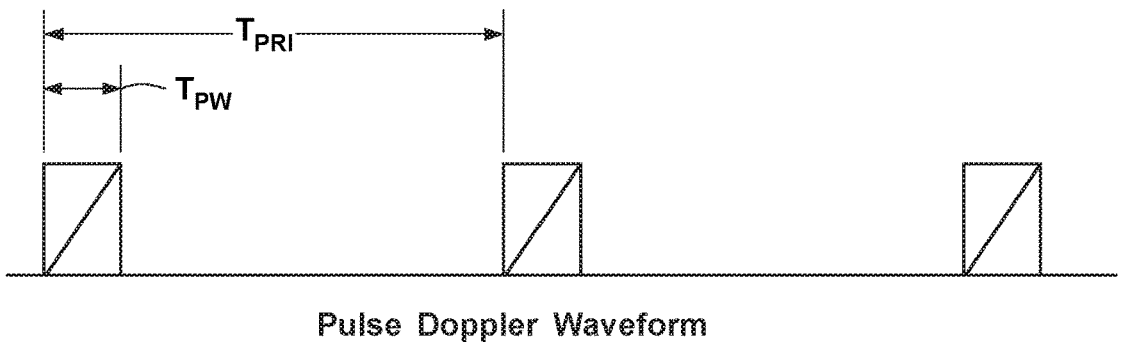
FIG. 18 illustrates an example of a pulse Doppler waveform that may be employed by the EMM radar.

FIG. 18 illustrates an example of a pulse Doppler waveform that may be employed by the EMM radar. The pulse repetition interval (PRI) may be configured as about 1 microsecond while the pulse width may be configured as about 0.1 microsecond. The slash represents a pulse compression coding described in a following paragraph.

The high 1 Mpps pulse repetition frequency (PRF) provides an unambiguous Doppler frequency range of 500 kHz as illustrated in FIG. 11 and discussed above. Primary targets include the incoming RPG 1130 and outgoing KVs (denoted as 1120 PRJ in FIG. 11). Other targets of interest include MANPADS 1140 and hostile fire (HF). In addition to providing information on the closing velocity, the pulse Doppler waveform separates the ground clutter spectrum 1110 from targets of interest.

Wideband modulation imposed on the transmitted pulse results in compression of the transmitted pulse width when processed with a matched filter. This modulation results in at least two advantages: First, the peak transmit power is reduced, and second, the compressed pulse provides the high range resolution needed for guidance. Many forms of pulse compression have been successfully implemented in modern radars including linear and nonlinear FM as well as many forms of phase coded modulation waveforms such as Frank codes and P codes.

The current embodiments use two pulse compression waveforms, a low resolution linear or possibly nonlinear FM for signal acquisition and a high-resolution polyphase phase shift keying (PSK) modulation for precision tracking. The low-resolution frequency-modulated (FM) waveform may be configured to provide a pulse compression of about 15:1, which results in a compressed pulse width of about 6.67 nanoseconds and a range resolution of about 1 meter. The bandwidth of this signal is approximately 150 MHz.

Figure 19:
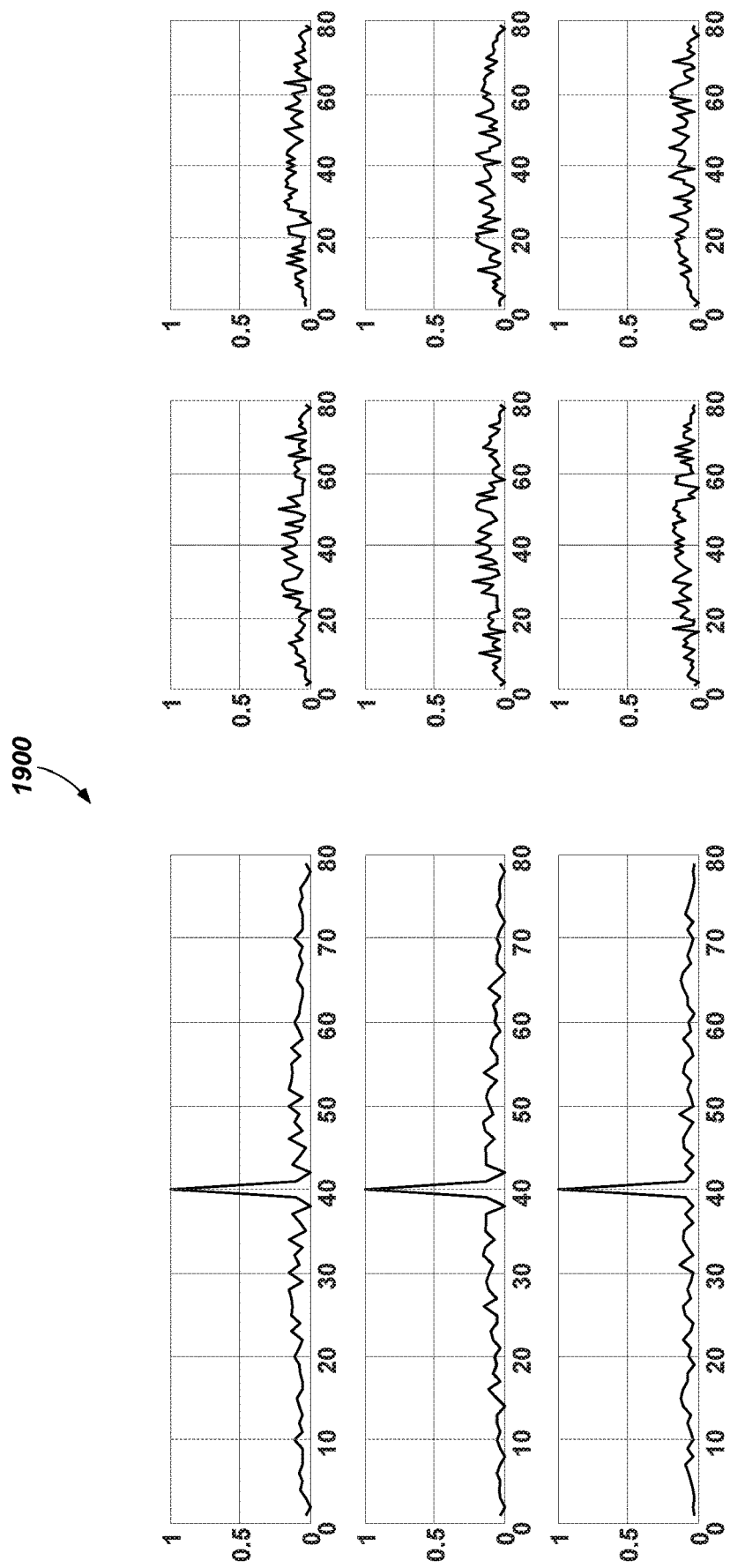
FIG. 19 illustrates a high resolution waveform based on a set of orthogonal polyphase-based phase shift keying (PSK) waveforms.

FIG. 19 illustrates high-resolution waveforms 1900 based on a set of orthogonal polyphase-based PSK waveforms on the left side. These waveforms have autocorrelation (or matched filter) responses that exhibit a central peak and low auto correlation sidelobes. On the right side, the waveforms illustrate the absence of a central peak as well as low sidelobes in the cross correlation response of the same matched filter to non-matched codes. The high-resolution codes include 64 polyphase chips contained in the transmitted pulse width. This results in a time-bandwidth product or compression ratio of 64, a compressed pulse width of 1.56 nsec, and a range resolution of 23.4 cm. The bandwidth of the transmitted pulse is approximately 640 MHz.

Figure 20:
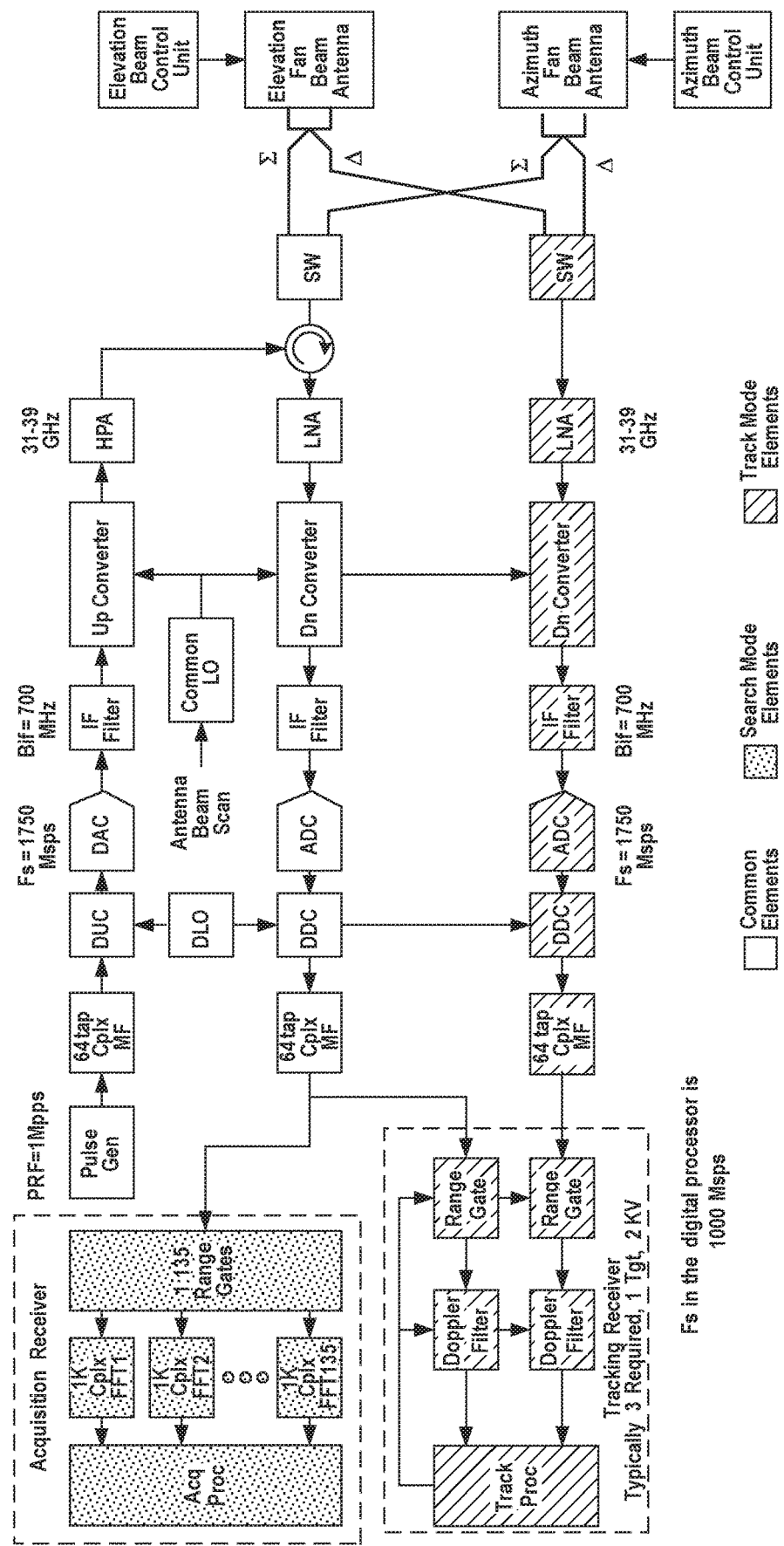
FIG. 20 shows a signal processing block diagram according to one embodiment of the EMM radar.

FIG. 20 shows a signal processing block diagram according to one embodiment of the EMM radar. The radar can be configured with independent signal processing units for each beam for simultaneous beam operation, or the radar can operate in a switched mode where a single signal processor is used to process each beam sequentially and alternatively. The switched mode lowers cost but decreases the tracking update rates. However, the switched mode meets operational requirements and the following discussion will address the single signal processor using sequentially switched antennas. For clarity in the drawing, element numbers are not used. However, each element is labeled and it will be readily apparent which element is being discussed.

The radar operates in either a search mode or track mode. The color code or shading indicates modules that are unique to each mode and which are common to both modes. Common elements are illustrated with no color or shading. Track mode elements are illustrated with blue shading or a light fill pattern. Search mode elements are illustrated with red shading or a medium fill pattern. Thus, it can be seen that the search mode elements are in the upper left corner of FIG. 20 in the acquisition receiver block. Common elements are shown in the top and middle process chains and the beam antennas and beam control units on the right side. Search mode elements are shown on the bottom process chain.

Antenna selection is made by way of the two switches (SW), and the sum and difference channels for the selected antenna are provided to the switches. The upper two paths show the sum channel processing while the lower path shows the difference channel processing.

In the top process path, starting from left to right, the transmit signal is generated by a pulse generator operating at the pulse repetition frequency (PRF) applied to a 64-tap complex finite impulse response (FIR) filter that generates the expanded transmit pulse compression waveform. The output of the FIR is up-converted from baseband to IF by the digital up converter (DUC) block driven by a digital local oscillator (DLO) at an intermediate frequency. The intermediate frequency signal is processed by a digital-to-analog converter (DAC) and processed with an intermediate filter (IF). The resulting signal is up-converted to a transmitted carrier frequency generated by another local oscillator in the common LO block. A high power amplifier (HPA) amplifies the signal, which is then applied to the sum port of the selected antenna.

Receive process paths are shown as the middle path and the bottom path and are discussed together with differences pointed out where appropriate. Both the sum and difference ports are processed by a low noise amplifier (LNA) down converted by the blocks labeled Dn Converter using the same local oscillator in the common LO block that was used for the transmit path. The down-converted signal is processed by an intermediate filter (IF) and the resulting signal is converted to a digital signal by a digital-to-analog converter (DAC). Once in the digital domain, the signal is down-converted to baseband by the digital down converter (DDC) block and using the same local oscillator (DLO) at the intermediate frequency. The baseband digital signal is then applied to the 64-tap complex matched filter, which compresses the received pulse.

In the search mode, the output of the middle path matched filter is range gated to split the signal into 135 parallel range channels and each is applied to a 1 k fast Fourier transform (FFT). This results in a 135×1024 matrix of range/Doppler cells every 1 msec. Each cell is processed to detect the presence of a target by the acquisition process block (Acq Proc). If a target is detected by the acquisition process, a handoff is made to the tracking portion of the receiver.

In the tracking portion of the receiver, the output of the middle path matched filter is applied to a range gate and then a tunable Doppler filter. The output of the Doppler filter feeds a tracking process (Track Proc) that tracks the selected target. On the bottom path, the output of the bottom path matched filter is applied to a range gate and then a tunable Doppler filter. The output of the Doppler filter feeds the tracking process (Track Proc) that tracks the selected target. A feedback path back from the tracking process to the Doppler filters and the range gates may assist in the tracking process. The tracking mode also uses the high-resolution pulse compression waveform for precision range tracking and allows for a certain amount of resolution of the RPG body parts.

The use of an electronic scanned antenna allows a great deal of flexibility in programming the operating modes of the radar. The basic operating time duration is a 1 millisecond slot whose duration is dictated by the processing time of the 1 k FFTs for the tracking Doppler filter. The radar operates in two modes: a search and acquisition mode where the radar is searching and acquiring targets and a track mode where target RPGs and KVs are tracked.

In some embodiments, the tracking receiver block is repeated multiple times to track multiple targets. As one example, the tracking receiver block may be repeated three times to track any three targets that could include any combination of RPGs and KVs. The radar processing for FIG. 20 has been described with one example of possible processing chains. Other processing algorithms and blocks may also be used. In addition, in the processing chain shown in FIG. 20, some operations may not be used and other operations may be included in the various processing chains.

Figure 21:
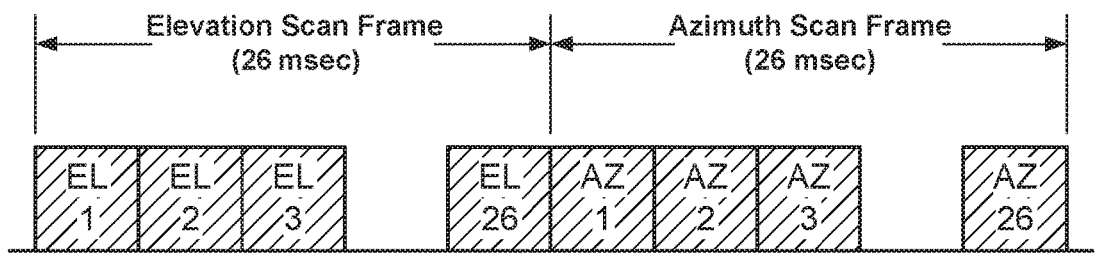
FIG. 21 shows a frame structure for a search mode of a radar process.

FIG. 21 shows a frame structure for a search mode of the radar process. The azimuth and elevation antennas are sequentially scanned over their respective 90 degree sectors. The scan involves 26 beam positions and each frame occupies 26 milliseconds. Since both beams cover the same sector, this ensures that an RPG will be detected within the 26 millisecond search frame time of one beam or the other after launch. Once a target is detected, the radar switches to a track only mode or a mixed track and search mode.

Figure 22:
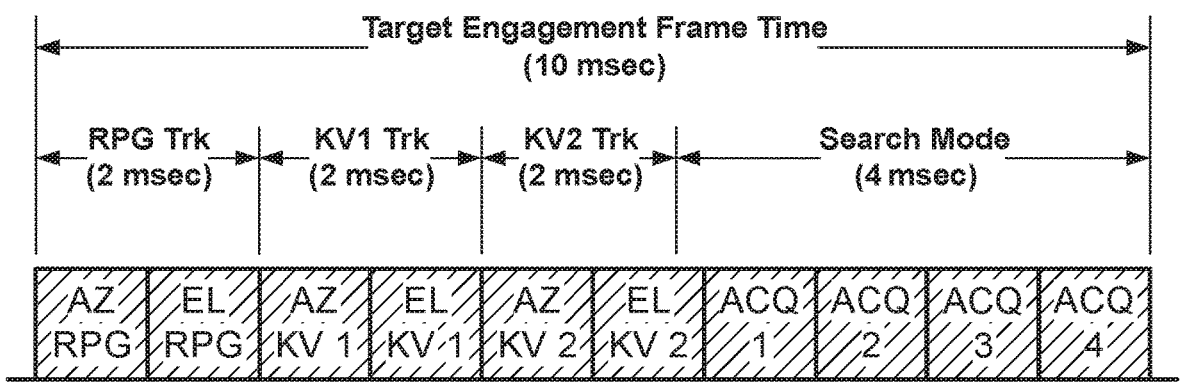
FIG. 22 shows a mixed track and search frame structure for the radar process.

FIG. 22 shows a mixed track and search frame structure for the radar process. In the mixed mode, a 10 millisecond frame structure ensures a 100 Hz update rate for tracking three vehicles (e.g., one RPG and two KVs) yet still provides four slots to continue a background search. Thus, in FIG. 22 for the example of tracking one RPG and two KVs, there is an azimuth RGP (AZRPG) slot, an elevation RPG slot (ELRPG), an azimuth kill vehicle 1 slot (AZKV1) slot, an elevation kill vehicle 1 slot (ELKV1), an azimuth kill vehicle 2 slot (AZKV2) slot, and an elevation kill vehicle 2 slot (ELKV2). Left over for background searching are four acquisition slots (ACQ1, ACQ2, ACQ3, and ACQ4).

If the search slots are eliminated, then the track update rate can be increased to 167 Hz. Further, if only 1 KV is being tracked, the track update rate can be increased further to 250 Hz. Other combinations are possible.

Figure 23:
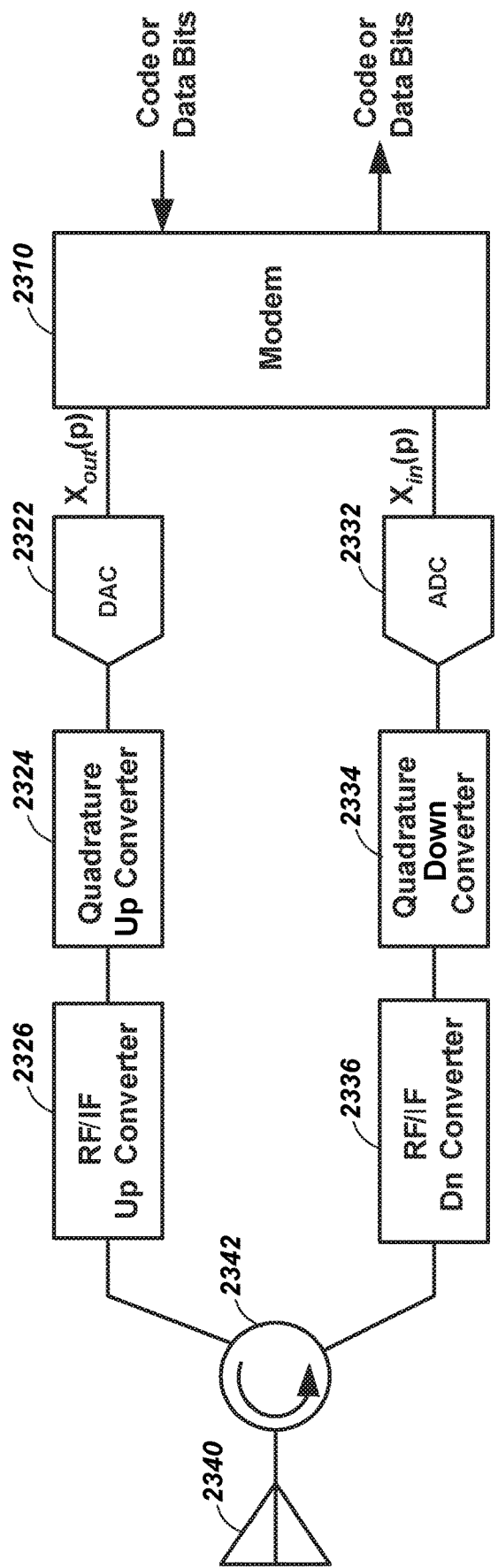
FIG. 23 illustrates a block diagram of a command link radio (CLR)

FIG. 23 illustrates a block diagram of a command link radio (CLR) to process commands and status between the EMM and one or more KVs. The CLR may include a transmit processing chain between a modem 2310 and an antenna 2340 and a receive processing chain between the antenna 2340 and the modem 2310. The transmit processing chain may include a digital-to-analog converter 2322 followed by a quadrature up converter 2324, and an RF/IF up converter 2326. The receive processing chain may include an RF/IF down converter 2336, a quadrature down converter 2334, and an analog-to-digital converter 2332. A duplexing device between the receive chain and the transmit chain may be included as indicated by the circulator 2342.

In some embodiments, identical units may be used in the EMM and KV units and provide two-way communication capability between the EMM and the KV. However, in some embodiments, the KV may be configured to employ a pair of orthogonal linear polarized elements whereas the EMM may be configured to employ a single linear polarized antenna.

The purpose will be explained later. The CLR may be configured to operate in single channel time division duplex (TDD) mode.

Figure 24:
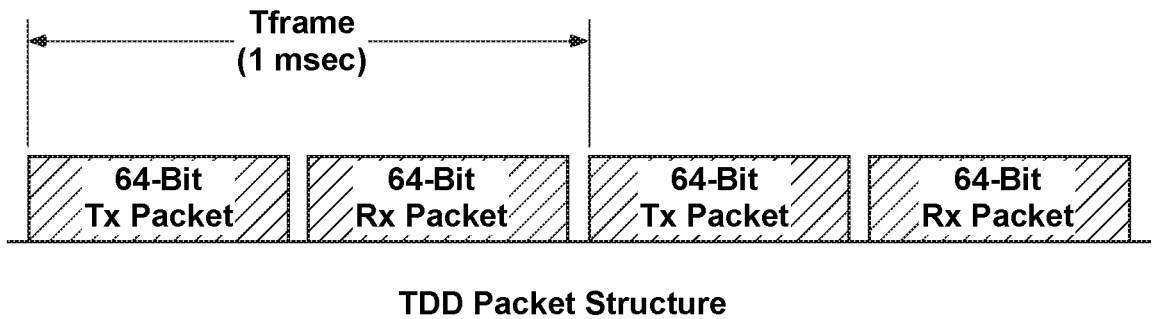
FIG. 24 shows a packet structure for a single channel time division duplex (TDD) mode.

FIG. 24 shows a packet structure for the single channel time division duplex (TDD) mode. The up and down packets (i.e., transmit and receive) may be configured to contain 64 bits to create a timeframe of 1 millisecond. This packet structure provides an instantaneous data rate of 128 kbps and 64 kbps in each of the transmit and receive directions. Each bit may be spread with a PSK code.

Figure 25:
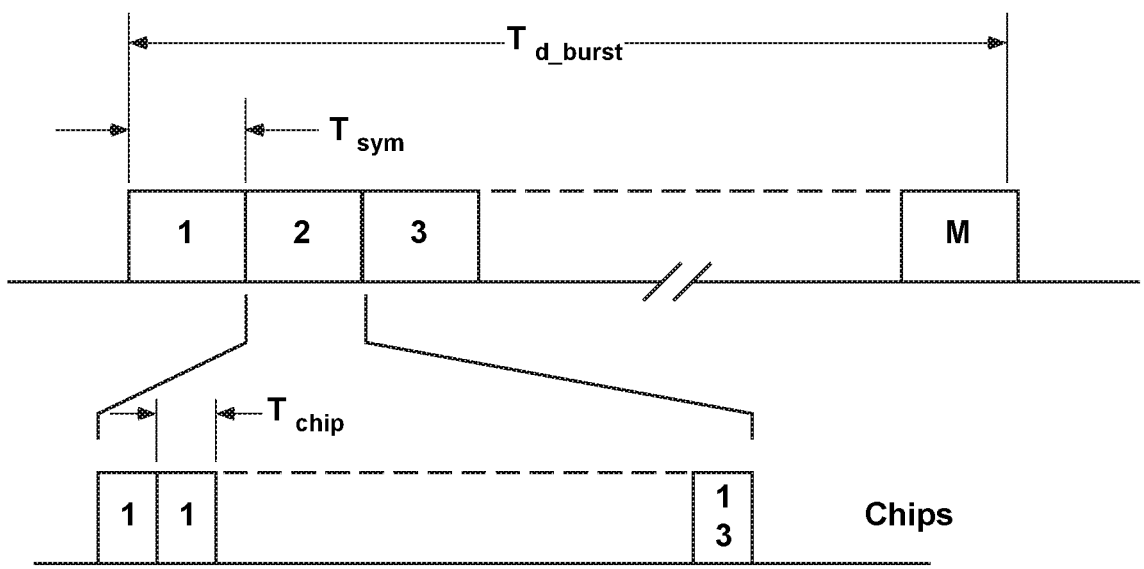
FIG. 25 illustrates a 13-bit Barker code implemented as a Binary PSK (BPSK) modulation.

FIG. 25 illustrates a 13-bit Barker code implemented as a binary PSK (BPSK) modulation. Thus 13 "chips" encode a single symbol and the chips can be assembled into a packet with a $T_{d\_burst}$ length of 13*M symbols. However, the spreading code can be any suitable modulation that exhibits low auto correlation sidelobes to achieve higher spreading factors if desired.

Figure 26:
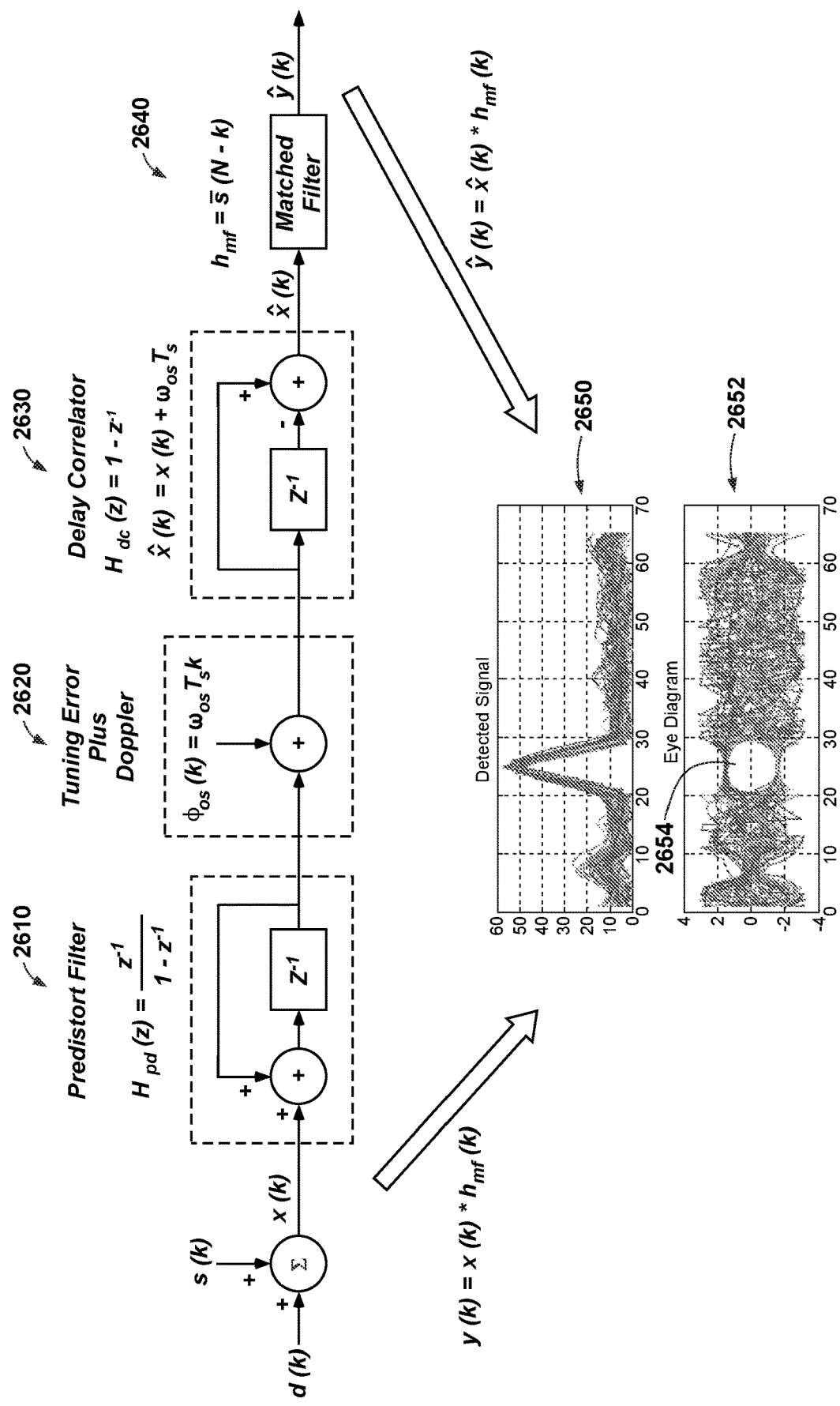
FIG. 26 illustrates operational concepts of a "Quick Sync" waveform, which may be used by embodiments transmitting and receiving CLR signals.

FIG. 26 illustrates operational concepts of a "Quick Sync" waveform, which may be used by embodiments transmitting and receiving CLR signals. Data bits to be transmitted are first spread with the Barker code and modulated to form a BPSK signal. The BPSK signal, represented as a series of plus and minus ones, is applied to a predistort filter 2610, which is a simple 2-bit accumulator. This process converts the BPSK signal to a QPSK signal which is transmitted 2620 over the air. On the receive side, the complex signal is applied to a delay correlator 2630 matched to the chip duration. This process removes the carrier frequency term and converts the QPSK modulation back to the original BPSK modulation. The BPSK signal is applied to a matched filter 2640, which compresses the waveform resulting in the magnitude plot 2650 and phase plot 2652 shown in the lower portion of FIG. 26. The magnitude provides a symbol sync pulse to sample the phase. Note eye diagram 2654 in the phase plot 2652. The Quick Sync modulation has the advantage of not requiring a carrier lock nor a symbol sync tracking loop, which is of great advantage considering the extremely short duration of the engagement timeline (i.e., about 300 to 500 milliseconds).

A miniature inertial measurement unit (IMU) may be located within the inertial navigation unit 1530 (FIG. 15) and may be configured to include a 3-axis accelerometer, a 3-axis gyro, a magnetometer, and a signal processing FPGA to provide spatial attitude of the EMM during helicopter maneuvering. The EMM IMU may be used to compute the initial attitude of the KV just prior to launch from the AN/ALE-47 countermeasure dispenser 200 (FIG. 15). The KV can then be preprogrammed with the proper pitch maneuver to put it on an approximate intercept path with the incoming RPG prior to launch.

The guidance processor 1520 (FIG. 15) may be configured to: 1) generate timing requirements for the pitch maneuver prior to launch, 2) generate launch commands for the KV, 3) generate guidance commands for the KV and transmit them to the KV via the CLR, and 4) generate the detonation command and transmit it to the KV via the CLR.

Figure 27:
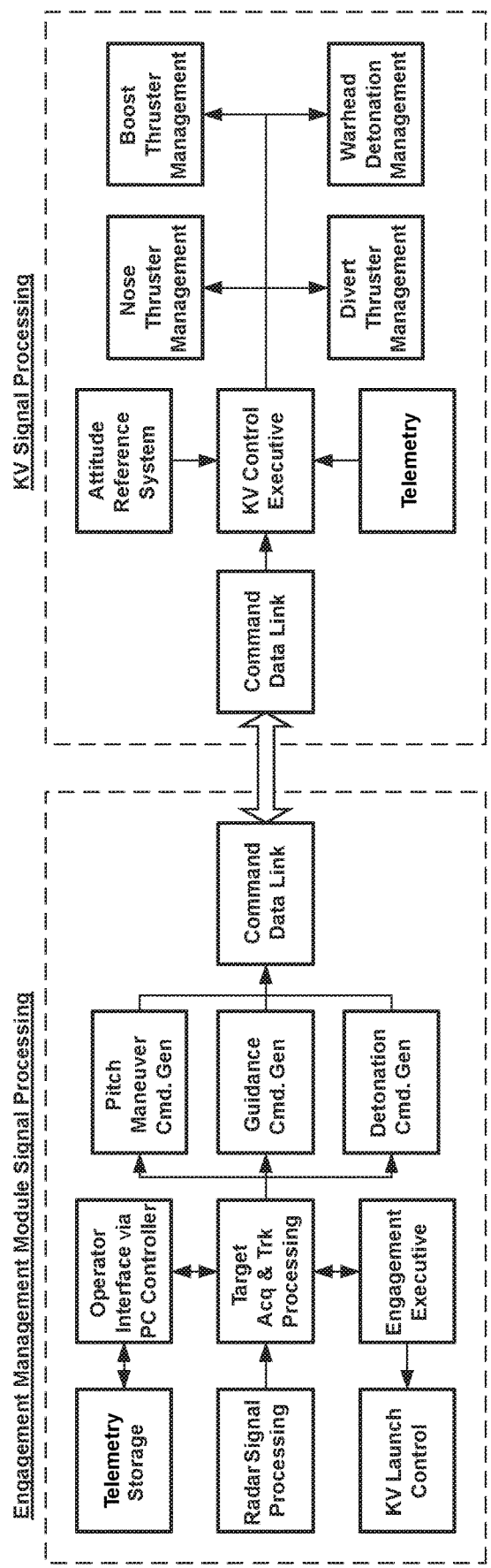
FIG. 27 shows distribution of signal processing between the EMM and a kill vehicle (KV) in one exemplary embodiment.

FIG. 27 shows distribution of signal processing between the EMM and the KV in one exemplary embodiment. On the EMM signal processing blocks may include telemetry storage for storing various telemetry data, radar signal processing as discussed above with reference to FIGS. 17-22, and KV launch controls. An operator interface may be included to control various aspects of the signal processing and gain access to data related to operation of the EMM and KV. Target acquisition and tracking processing may be included as discussed above with reference to FIGS. 17-22. An engagement executive unit may be included to control operations of the KV launch control responsive to the target acquisition and tracking processing. Also in response to the target acquisition and tracking processing, and after the KV has been launched, a pitch maneuver command generator may generate commands to the KV related to adjusting the pitch of the KV, a guidance command generator may generate commands related to guidance of the KV toward the RPG, and a detonation command generator may generate commands related to detonating the KV when it is in proximity to the RPG. An INS may be included to provide position, velocity, attitude, and angle rate information for guidance, and thruster control. Generation of commands related to each of pitch, guidance, and detonation are explained more fully below. The commands are transmitted through the command data link as explained above with reference to FIGS. 23-26.

On the KV side, commands are received through the command data link as explained above with reference to FIGS. 23-26. A KV control executive may be included to control operation of other units based on the commands that are received. An attitude reference system may develop and provide information about the attitude of the KV for use by the control executive. A telemetry unit may be included to gather information about operation parameters of the KV, which can be supplied to the control executive, which can then transmit telemetry information through the command data link back to the EMM. Attitude information, telemetry information and commands from the EMM may all be interpreted by the control executive to control a nose thruster management unit, and boost thruster management unit, a divert thruster management unit, and a warhead detonation management unit.

In generating commands for controlling pitch maneuvers for the KV, a HAPS pitch maneuver algorithm re-orients the HAPS kill vehicle (KV) velocity vector following launch toward the expected intercept point following booster burn-out.

In one embodiment, the algorithm includes two parts, an EMM component that computes the timing and firing sequence of the nose mounted pitch thrusters and a KV component that fires the nose thrusters after launch using the computed timing sequence.

In another embodiment, onboard processing computes the required line of sight (LOS) prior to launch and a second offboard processing part executed within the KV after launch uses the attitude sensors onboard the KV to control the firing on the nose thrusters to achieve the required LOS orientation following the firing of the boost motor. The following discussion addresses the first embodiment.

Figure 28:
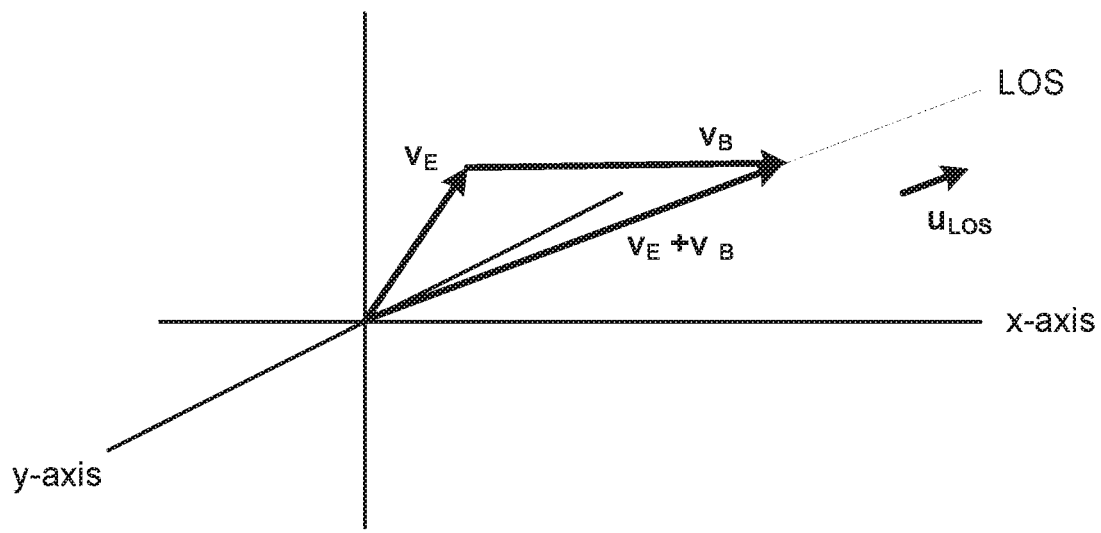
FIG. 28 shows orientation of the KV velocity vectors associated with the pitch maneuver.

FIG. 28 shows orientation of the KV velocity vectors associated with the pitch maneuver. Let $v_E$ be the KV velocity vector following launch, $v_B$ be the velocity vector increment imparted by the boost motor following the pitch maneuver, and $u_{LOS}$ be the line of sight (LOS) unit vector oriented toward the expected intercept point. The objective of the pitch maneuver is to orient the body of the KV in a direction such that the vector sum of $v_E$ and $v_B$ is oriented along the desired LOS unit vector $u_{LOS}$.

To accomplish this orientation, the pitch algorithm is organized into two parts: one part executed onboard the HAPS platform (e.g., by the EMM) prior to launch, which computes the firing commands for the nose thrusters needed to achieve the proper orientation, and the second part implemented within the KV and executed after launch to actually fire the nose thrusters.

For the first part related to the EMM portion, given $v_E$, $u_{LOS}$, and the magnitude of $v_B$, find the orientation of $v_B$ which satisfies the following constraint:

$$\frac{v_E + v_B}{|v_E + v_B|} = u_{LOS} \tag{1}$$

Vector $v_E$ is known from the attitude of the helicopter, the orientation of the launcher relative to the helicopter, and the estimated launch velocity of the KV. The LOS vector, $u_{LOS}$, is generated by the guidance algorithm. A simple version of the latter is just the LOS to the incoming RPG. A more sophisticated version is based on a computed point of intercept (POI).

The magnitude of $v_B$ is known from the mass properties of the KV and that of the boost motor. For a boost motor impulse, $J_B$, and eject vehicle configuration mass, $m_{EV}$, the magnitude of $v_B$ is given by:

$$V_B = |v_B| = m_B J_B \tag{2}$$

Note that the three vectors, $v_E$, $v_B$, and $u_{LOS}$, must lie in the same plane.

Figure 29:
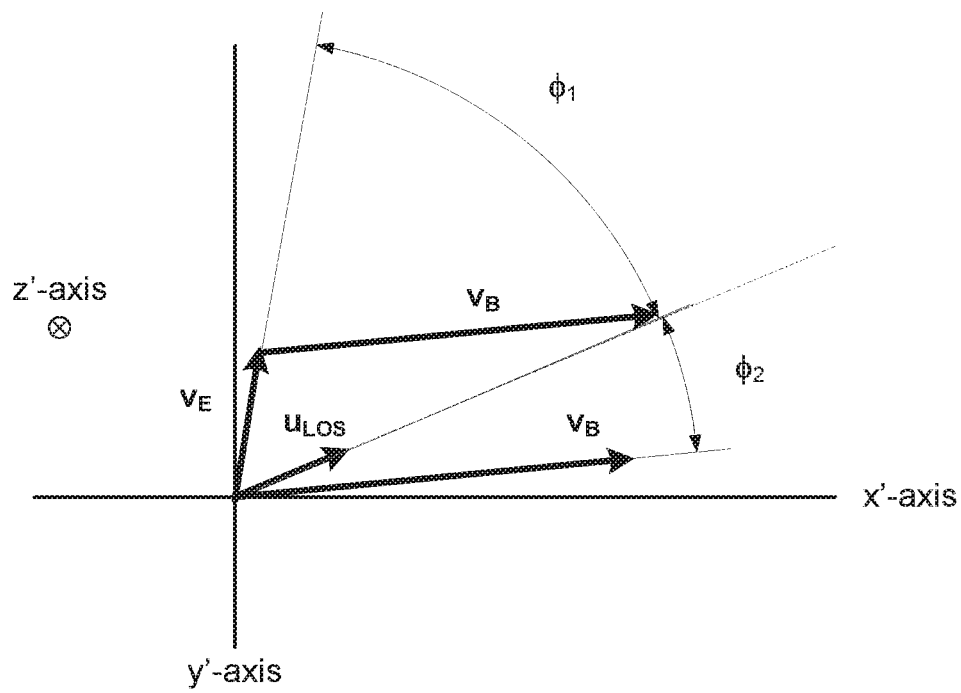
FIG. 29 illustrates an x', y', z' coordinate system in which the z' y' plane contains the three vectors used in the pitch algorithm.

FIG. 29 illustrates an x', y', z' coordinate system in which the z' y' plane contains the three vectors used in the pitch algorithm.

When the constraint, (1), is satisfied, the z' component is zero. In this case:

$$|v_E + v_B| = |v_E|\cos(\phi_1) + |v_B|\cos(\phi_2)$$

$$|v_E|\sin(|\phi_1|) = |v_B|\sin(|\phi_2|) \tag{3}$$

Angles $\phi_1$ and $\phi_2$ are computed as follows;

$$v_E \times v_B = |v_E| \cdot |v_B| \sin(\phi_1) u_z = w_1 \tag{4}$$

$$|w_1| = |v_E| \cdot |v_B| \cdot |\sin(\phi_1)| \tag{5}$$

$$|\sin(\phi_1)| = \frac{|w_1|}{|v_E| \cdot |v_B|} \tag{6}$$

$$|\phi_1| = \sin^{-1}\left(\frac{|w_1|}{|v_E| \cdot |v_B|}\right) \tag{7}$$

$$|\phi_2| = \sin^{-1}\left(\frac{|v_E|\sin(|\phi_1|)}{|v_B|}\right) \tag{8}$$

Finally, from equations (3), (7), and (8), the required boost velocity vector and pre-boost body orientation is given by:

$$v_B = |v_E + v_B| u_{LOS} - v_E \tag{9}$$

If the vectors in the preceding equation are expressed in inertial space, then the desired pointing vector, $u_B$, is also in inertial space.

$$u_b = \frac{v_B}{|v_B|} \tag{10}$$

Let $[\psi_{kv}, \theta_{kv}, \phi_{kv}]$ be the Euler angles defining the attitude of the KV after launch. To compute the azimuth and elevation angles required for the pitch maneuver, the unit vector $u_B$ must be converted to body coordinates. This is accomplished by the standard coordinate transformation:

$$u_{Bb} = A_x(\phi) A_y(\theta) A_z(\psi) u_{Be} \tag{11}$$

Subscripts $u_{Bb}$ and $u_{Be}$ are used to identify body and earth coordinates respectively.

The required azimuth and elevation pitch maneuver angles are given by:

$$\theta_{oz} = \tan^{-1}\left(\frac{v_{Bby}}{v_{Bbx}}\right) \tag{12}$$

$$\theta_{el} = \sin^{-1}\left(\frac{-v_{bbz}}{|v_B|}\right)$$

Figure 30:
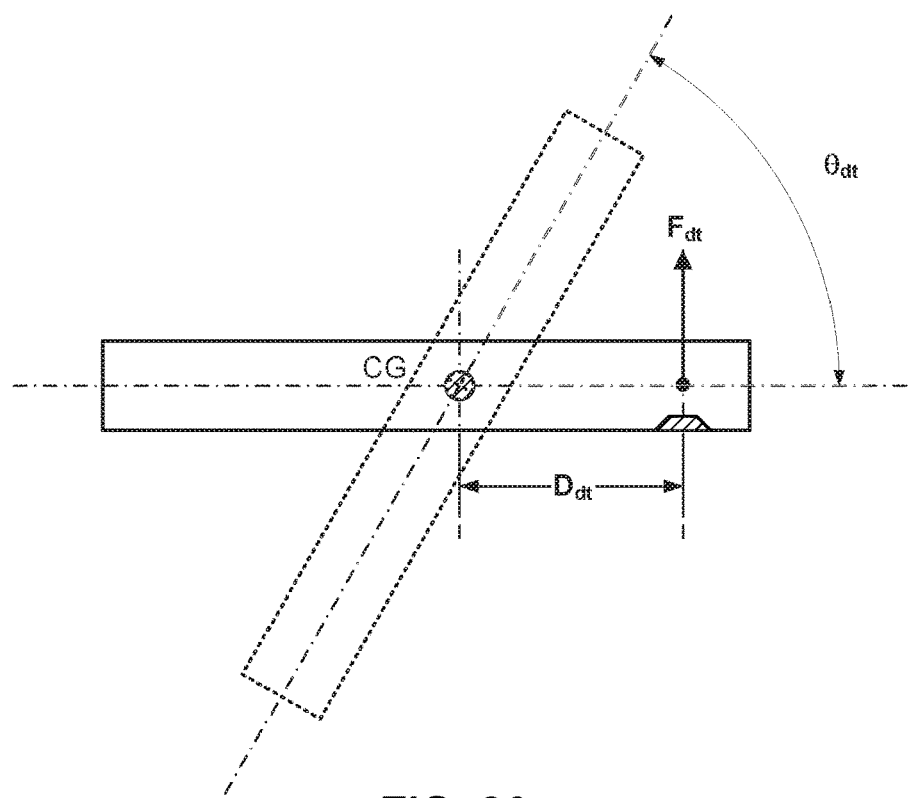
FIG. 30 shows a configuration of the KV and the location of one of the four nose thrusters relative to the center of gravity.

FIG. 30 shows a configuration of the KV and the location of one of the four nose thrusters relative to the center of gravity. When the nose thruster fires, a force $F_{dt}$ is applied at the location of the nose thruster, but in the opposite direction of the physical thruster. This force causes both a lateral and a rotational acceleration about the center of gravity. Typically, the rotational acceleration dominates and the lateral acceleration can be ignored in the following analysis.

Figure 31:
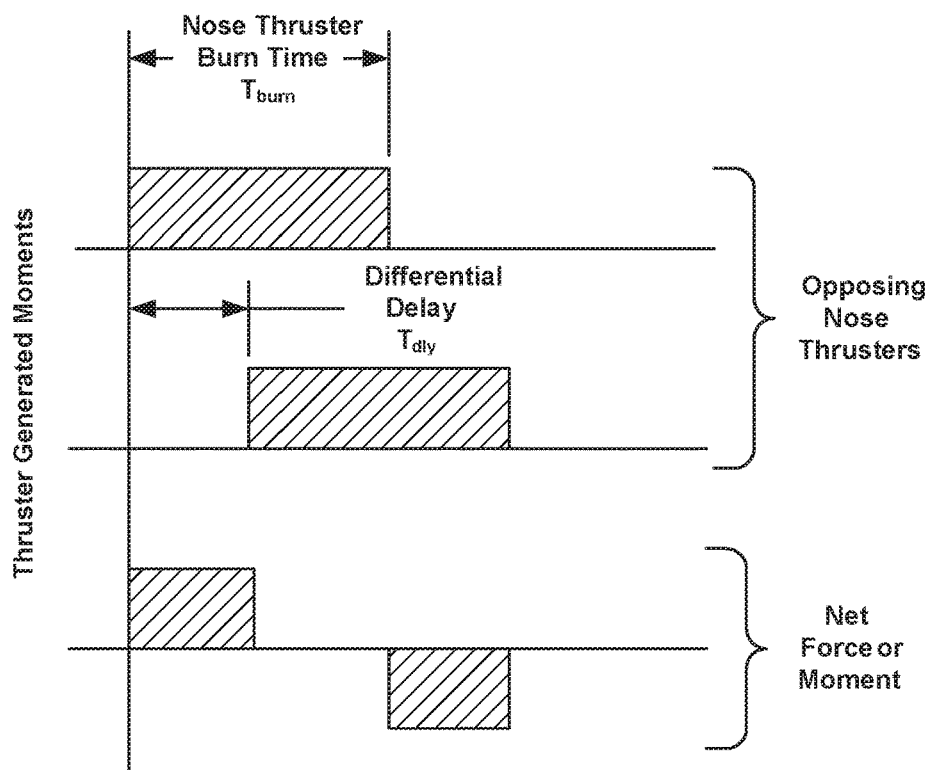
FIG. 31 illustrates an example of firing times for the nose thrusters.

FIG. 31 illustrates an example of firing times for the nose thrusters. Opposite pairs of nose thrusters will be fired with some differential delay as shown in FIG. 31. Assuming the thrusters fire with equal force and duration, the net force or torque is shown at the bottom of the figure.

For a moment of inertia, $I_{KV}$, time varying nose thruster force, $F_{dt}(t)$, and distance, $D_{dt}$, from the center of gravity, the time varying angular acceleration, $\alpha_{dt}(t)$ is given by:

$$\alpha_{dt}(t) = \frac{F_{dt}(t) D_{dt}}{I_{KV}} = \ddot{\theta}(t) \tag{13}$$

Using the known thrust force of the nose thrusters, the total rotation angle, $\theta_{dt}$, is given by:

$$\theta_{dt} = \frac{F_{dt} D_{dt}}{I_{KV}}\left(\frac{1}{2}T_{dly}^2 + T_{dly}(T_{burn} - T_{dly}) + \frac{1}{2}T_{dly}^2\right) \tag{14}$$

$$= \frac{F_{dt} D_{dt}}{I_{KV}} T_{dly} T_{burn}$$

The required differential delay is given by:

$$T_{dly} = \frac{I_{KV} \theta_{dt}}{F_{dt} D_{dt} T_{burn}} \tag{15}$$

The guidance algorithm employs a "guide to intercept point" concept whereby thruster or acceleration commands are generated to "steer" the KV directly to the computed intercept point. This algorithm also includes two parts: an EMM component and an off board KV component. In the EMM component, using the RPG and KV tracking information provided by the HAPS radar, a sequence of divert thrust vectors will be generated to guide the KV to intercept the RPG. These divert thrust vectors, in inertial coordinates; will be uplinked to the KV over the command radio link. In the KV component, the inertial coordinates thrust vectors are converted to body coordinates using its onboard attitude heading reference sensor (ARHS). Since the KV will be spinning, the KV will select the next available thruster based on the KV attitude and the thrust vector command and fire the thruster when it is aligned in the proper direction.

Figure 32:
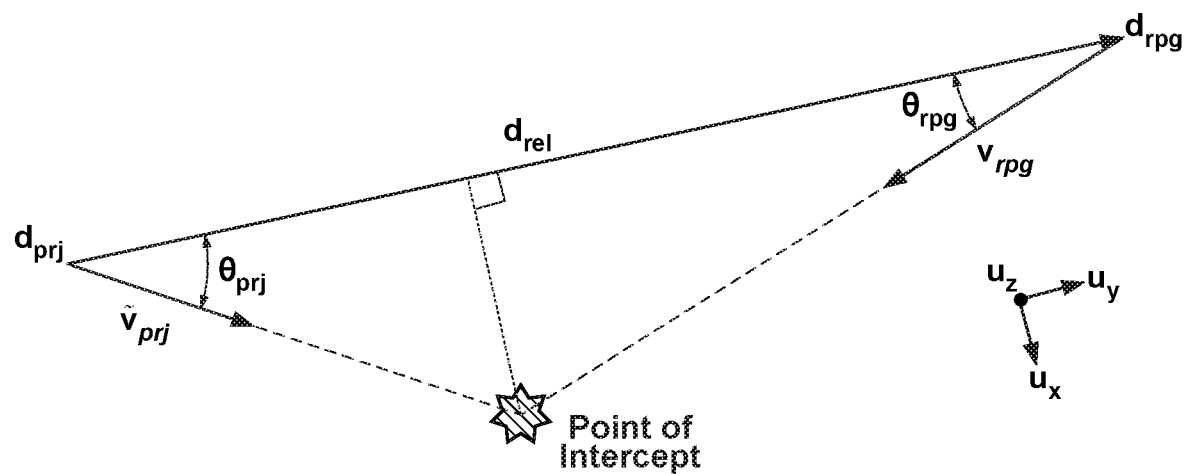
FIG. 32 illustrates intercept geometry for the KV on a plane in 3-D space.

FIG. 32 illustrates intercept geometry for the KV on a plane in 3-dimensional space. The intercept geometry is defined by the position of the KV, $d_{prj}$, the position of the RPG, $d_{rpg}$, and the RPG velocity vector, $v_{rpg}$. Note that this plane is also defined by the relative position vector $d_{rel}=d_{rpg}-d_{prj}$ and $v_{rpg}$. Assuming constant velocity for the RPG and KV, which is generally true for non-maneuvering vehicles in the terminal phase, a point of intercept (POI) will also lie in this plane. Now, what is needed is to compute the desired KV velocity vector, $\tilde{v}_{prj}$, also in this plane and heading angle, $\tilde{\theta}_{prj}$, that will intercept the RPG at the POI. Note that $\tilde{v}_{prj}$ generally will not be equal to the actual KV vector, $v_{prj}$, and the thruster commands will be generated to cause the true velocity vector to converge to the desired velocity vector.

The HAPS EMM radar and an associated Kalman filter will provide state estimates including the position and velocity vectors for both the RPG and KV. These quantities will be time tagged such that the values are valid at time $t=t_k$ for the k-th measurement. However, for the following development, the time specific tag will be dropped and the assumed true quantities are simply noted as: $d_{prj}$, $v_{prj}$, $d_{rpg}$, and $v_{rpg}$. The desired values will be indicated with a tilde.

Three unit vectors are defined, $u_x$, $u_y$, and $u_z$, where $u_y$ is aligned with the relative distance vector $d_{rel}$, $u_x$ is normal to $d_{rel}$ and in the plane defined by $d_{rel}$ and $v_{rpg}$, and $u_z$ is orthogonal to both $u_x$ and $u_y$.

Consider the following cross product:

$$-d_{rel} \times v_{rpg} = |d_{rel}| \cdot |v_{rpg}| \cdot \sin(\theta_{rpg}) \cdot \tilde{u}_z \quad (16)$$

Another vector, $\eta_\theta$, which is a rotation vector defines angle $\theta_{rpg}$:

$$\eta_\theta = \sin(\theta_{rpg}) u_z = \frac{-d_{rel} \times v_{rpg}}{|d_{rel}| \cdot |v_{rpg}|} \quad (17)$$

The magnitude of the angle $\theta_{rpg}$ is given by:

$$|\theta_{rpg}| = \sin^{-1}(|\eta_\theta|) \quad (18)$$

Note that the sign of $\theta_{rpg}$ is lost but is preserved in the vector $\eta_\theta$.

To meet the intercept requirement where both arrive at the POI at the same time, the magnitude of the velocity components of $\tilde{v}_{prj}$ and $v_{prj}$ normal to $d_{rel}$ must be equal.

$$|\tilde{v}_{prj}|\sin(|\tilde{\theta}_{prj}|) = |v_{rpj}|\sin(|\theta_{rpg}|) \quad (19)$$

If it is assumed that $|\tilde{v}_{prj}| = |v_{prj}|$, the magnitude of the desired KV heading angle is given by:

$$|\tilde{\theta}_{prj}| = \sin^{-1}\left(\frac{|v_{rpg}|\sin(|\theta_{rpg}|)}{|\tilde{v}_{prj}|}\right) \quad (20)$$

Now the unit vectors $u_x$, $u_y$, and $u_z$ are given by:

$$u_z = |\eta_z|$$
$$u_y = |d_{rel}|$$
$$u_x = u_y \times u_z \quad (21)$$

Noting that angles $\theta_{rpg}$ and $\theta_{prj}$ are always in opposite directions as defined by unit vector $u_z$, the desired KV velocity vector is given by:

$$\tilde{v}_{prj} = [u_x | u_y | u_z] |u_{prj}| A_z(-\theta_{prj}) u_y$$

$$= \tilde{v}_{prj\_x} u_x + \tilde{v}_{prj\_y} u_y + \tilde{v}_{prj\_z} u_z$$

where $A_z$ is the rotation matrix about the z-axis defined by angle $\theta_{prj}$, and $\tilde{v}_{prj\_x}$, $\tilde{v}_{prj\_y}$, and $\tilde{v}_{prj\_z}$ are the xyz components of $\tilde{v}_{prj}$.

The guidance velocity correction vector $\Delta v_g$ needed to align current velocity vector $v_{prj}$ with the desired velocity vector $\tilde{v}_{prj}$ is simply:

$$\Delta v_g = \tilde{v}_{prj} - v_{prj} \quad (22)$$

Note that for cases where the guidance correction vector is small compared to the velocity vector, the guidance correction vector will be normal to both velocity vectors. This relationship is consistent with the divert thruster concept where the thrusters will generally impart a velocity correction normal to the velocity vector.

Figure 33:
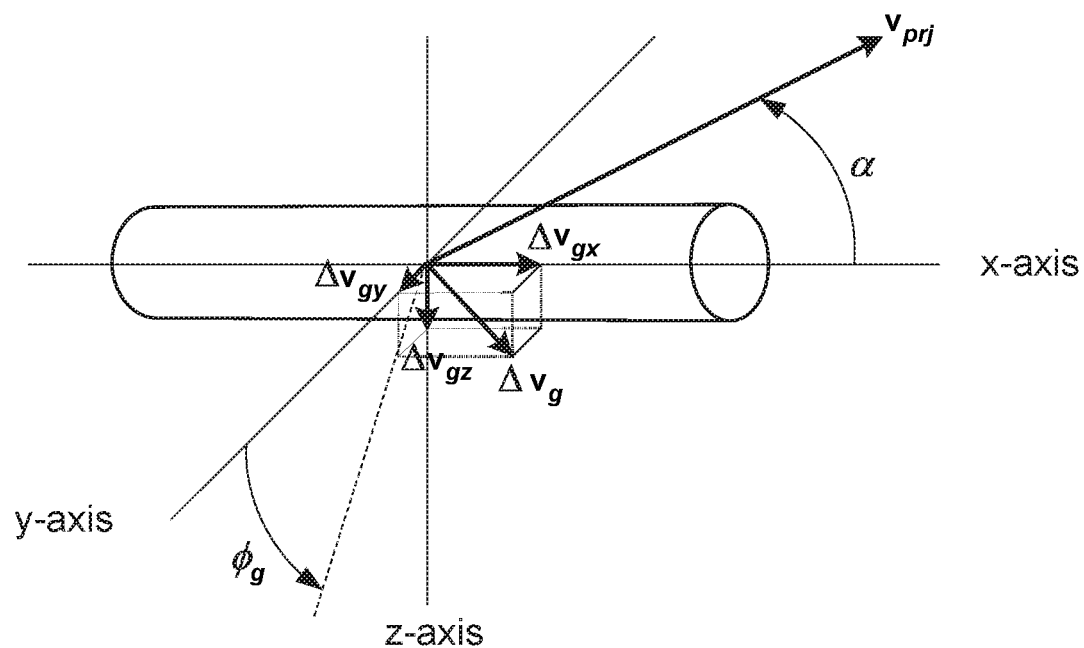
FIG. 33 shows a guidance correction velocity vector projected onto the KV body coordinate system.

FIG. 33 shows the guidance correction velocity vector, $\Delta v_g$ projected onto the KV body coordinate system. For the KV component of the guidance algorithm, the KV velocity vector $v_{prj}$ is also shown for reference. Note that the velocity vector may be oriented with an angle of attack $\alpha$.

The inertial guidance vector in earth coordinates, $\Delta v_{g\_e}$, transmitted via the guidance data link is converted to body coordinates, $\Delta v_{g\_b}$, using the standard coordinate transform with the KV orientation defined by roll angle $\phi$, pitch angle $\theta$, and yaw angle $\psi$.

$$\Delta v_{g\_b} = A_{E2B}(\phi, \theta, \psi)\Delta v_{g\_e} \quad (23)$$
$$= A_x(\phi)A_y(\theta)A_z(\psi)\Delta v_{g\_e}$$

Letting C and S be the cosine and sine functions, matrices $A_x$, $A_y$, and $A_z$ are given by:

$$A_x = \begin{bmatrix} 1 & 0 & 0 \\ 0 & C & S \\ 0 & -S & C \end{bmatrix}, A_y = \begin{bmatrix} C & 0 & -S \\ 0 & 1 & 0 \\ S & 0 & C \end{bmatrix}, A_z = \begin{bmatrix} C & S & 0 \\ -S & C & 0 \\ 0 & 0 & 1 \end{bmatrix} \quad (24)$$

From this point on, it is assumed that all vector quantities are expressed in body coordinates. Let the guidance velocity vector be decomposed into the three coordinate components shown in FIG. 33.

$$\Delta v_g = \Delta v_{gx} + \Delta v_{gy} + \Delta v_{gz} \quad (25)$$
$$= \Delta v_{gx} \vec{u}_x + \Delta v_{gy} \vec{u}_y + \Delta v_{gz} \vec{u}_z$$

The component of the guidance velocity vector in the yz-plane is given by: $\Delta v_{gyz} = \Delta v_{gy} + \Delta v_{gz}$.

The magnitude, $V_{gyz}$, and roll angle $\phi_g$ of this vector is given by:

$$|\Delta v_{gyz}| = V_{gyz} = \sqrt{\Delta v_{gy}^2 + \Delta v_{gz}^2} \quad (26)$$
$$\phi_g = \tan^{-1}\left(\frac{\Delta v_{gz}}{\Delta v_{gy}}\right)$$

Figure 34:
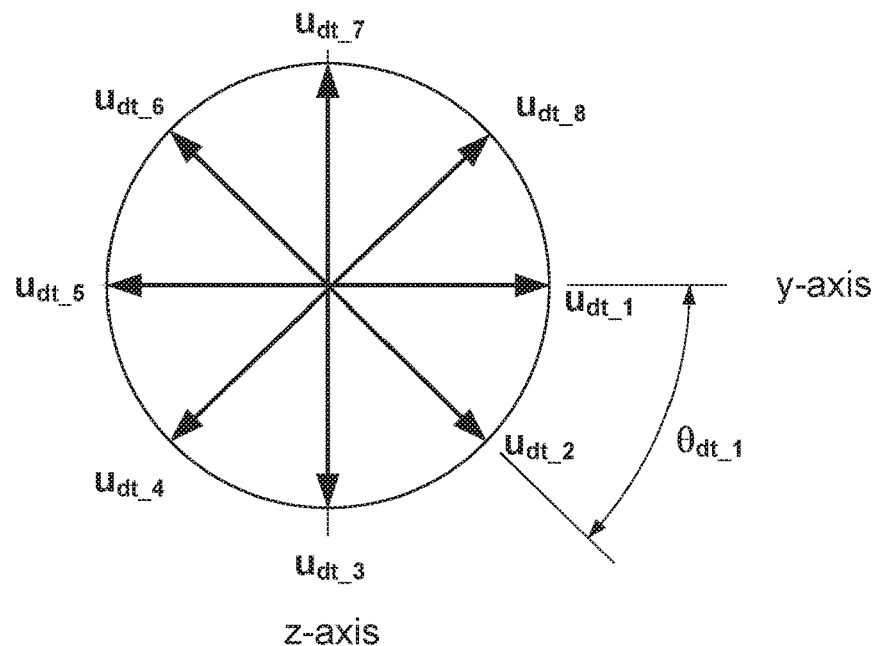
FIG. 34 shows orientation of eight divert thrusters and establishes a reference notation.

FIG. 34 shows orientation of the eight divert thrusters and establishes a reference notation. Thruster No. 1 is orientated along the KV y-axis, and the remaining thrusters are numbered clockwise looking forward along the x-axis.

The k-th thruster is oriented at angle $\theta_{dt\_k}$:

$$\theta_{dt\_k} = (k-1)\frac{\pi}{8} \qquad (27)$$

Each divert thruster will be associated with a unit vector $u_{dt\_k}$:

$$u_{dt\_k} = A_x(\theta_{dt\_k})u_y \qquad (28)$$

Note that the force vector, $f_{dt\_k}$, for the k-th thruster is actually orientated in the opposite direction from the thruster orientation. Here $F_{dt}$ is the force generated by the divert thrusters.

$$f_{dt\_k} = -F_{dt}u_{dt\_k} \qquad (29)$$

When the divert thruster fires, it will impart a velocity, $\Delta V_{dt}$, increment roughly normal to the KV velocity vector and equal to the ratio of the divert thruster impulse, $I_{dt}$ and the KV mass, $m_{prj}$ $$\Delta V_{dt} \sim \frac{I_{dt}}{m_{prj}} \qquad (30)$$

Since the KV body is spinning about the x-axis, there will be some smear of the divert thrust vector. Depending on the spin rate, the net velocity increment will be diminished due to the spin. Also, the divert thrusters must be timed to fire such that the resulting velocity increment is oriented in the proper direction.

For a time-varying thruster orientation, the net incremental velocity vector is:

$$\Delta v_{dt} = \int_0^{T_{dt}} -\frac{F_{dt}}{m_{prj}} u_{dt\_k}(t) dt \qquad (31)$$

Where, $T_{dt}$ is the duration of the divert thruster firing time.

The analysis can be simplified by assuming a rectangular thrust function that is constant over the firing duration.

Figure 35:
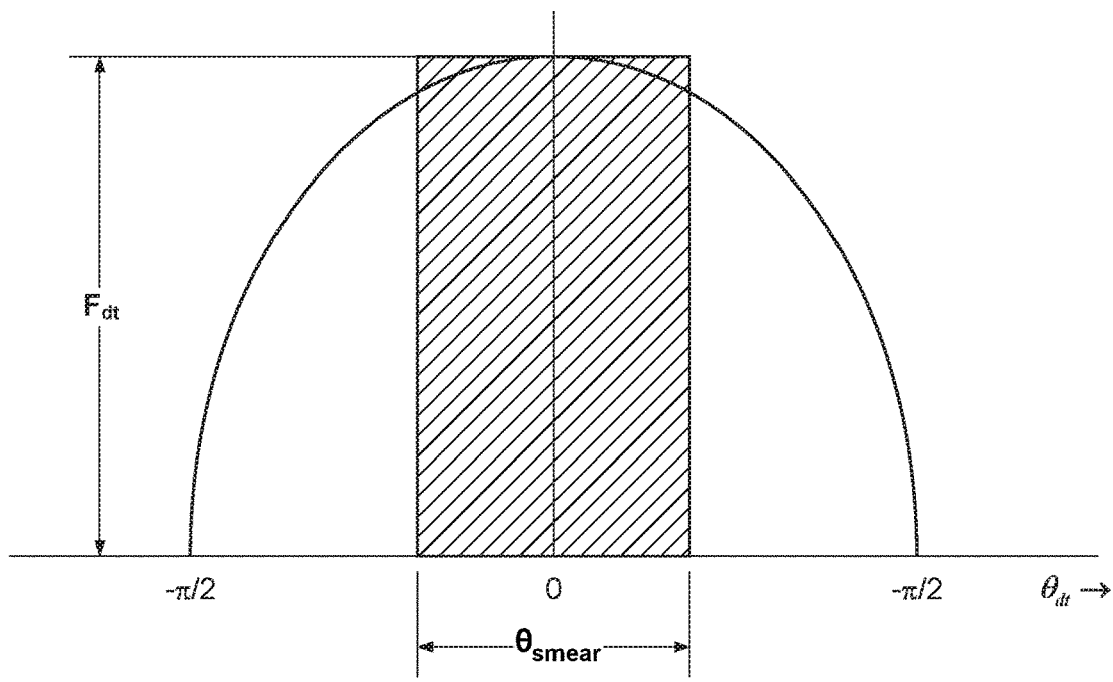
FIG. 35 illustrates variation of thrust force along a desired axis.

FIG. 35 illustrates variation of thrust force along a desired axis. Let $\theta=0$ in FIG. 35 be the desired correction angle. Let $\theta_{dt}(t)$ be the time varying thrust angle, and $\theta_{smear}$ be the smear angle due to the body rotation. For a given spin rate, $\omega_x$, the smear angle is given by:

$$\theta_{smear} = \omega_x T_{dt} \qquad (32)$$

Assume the thruster firing is symmetrical about zero or the desired velocity correction angle. The net or average thrust directed along the desired correction angle will be:

$$\bar{F}_{dt} = \frac{1}{\theta_{smear}} \int_{-\theta_{smear}/2}^{\theta_{smear}/2} F_{dt} \cos(\theta_{dt}) d\theta_{dt} \qquad (33)$$

$$= \frac{2F_{dt}}{\theta_{smear}} \sin\left(\frac{\theta_{smear}}{2}\right)$$

$$= F_{dt} \Box CF(\theta_{smear})$$

Here $CF(\theta_{smear})$ is a thrust correction factor to account for the smear angle.

Figure 36:
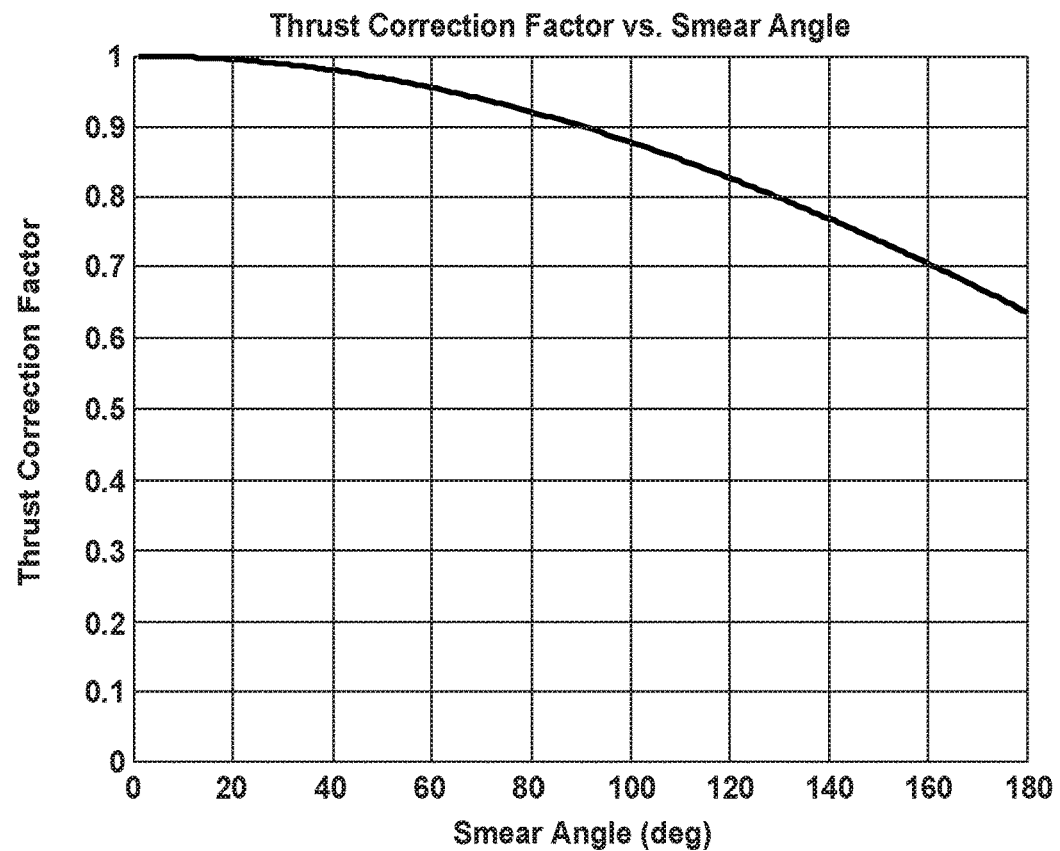
FIG. 36 shows a plot of thrust correction factor versus smear angle.

FIG. 36 shows a plot of thrust correction factor versus smear angle. FIG. 36 shows that the net loss due to smear is relatively small. Typically, the smear angle will be approximately 45 degrees for a correction factor of 0.9745.

Figure 37:
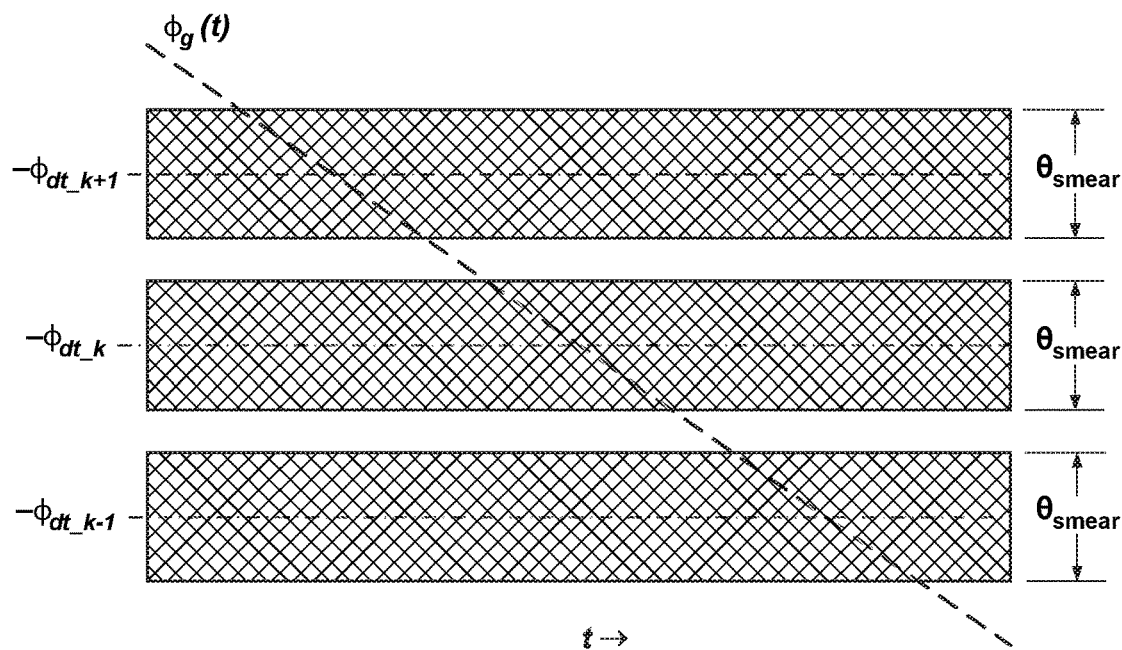
FIG. 37 shows time variation of guidance thrust angle along with static thruster orientation angles, all in body coordinates.

The next issue is to time the firing of the divert thruster such that the net thrust is in the correct direction. FIG. 37 shows the time variation of guidance thrust angle, $\phi_g(t)$ along with the static thruster orientation angles, all in body coordinates. The negative sign on the thruster orientation vectors indicate that the thrust is actually opposite that of the orientation. For a positive spin direction (i.e., clockwise looking forward), the desired thrust angle will rotate counterclockwise in body coordinates.

The divert thruster firing algorithm can be stated as follows:

1. Wait until the magnitude of the divert velocity increment in the yz-plane exceeds some factor of the guidance velocity vector in the yz-plane. Generally, $\alpha$ is set to 0.4 to avoid thruster chatter.

$$|v_{gyz}| \geq \alpha V_{dt} \qquad (34)$$

2. Find the next available thruster (i.e., one that has not been fired) that meets the offset requirement of leading the desired angle by half the smear angle.
3. Fire the thruster when the orientation vector reaches half a smear angle prior to the desired thrust angle.

$$\mathrm{mod}_{2\pi}\left(-\phi_{dt\_k} - \phi_g(t) - \frac{\theta_{smear}}{2}\right) = 0 \qquad (35)$$

Turning to the detonation command, it also has an onboard and offboard component. The basic idea is to compute a time to go, $T_{go}$, based on KV and RPG relative position and velocity, at the time of measurement, $T_{meas}$, and send a time of detonation, $T_{det}$, based on synchronized clocks running in the EMM and KV. The EMM and KV clocks would be synced just prior to launch.

Figure 38:
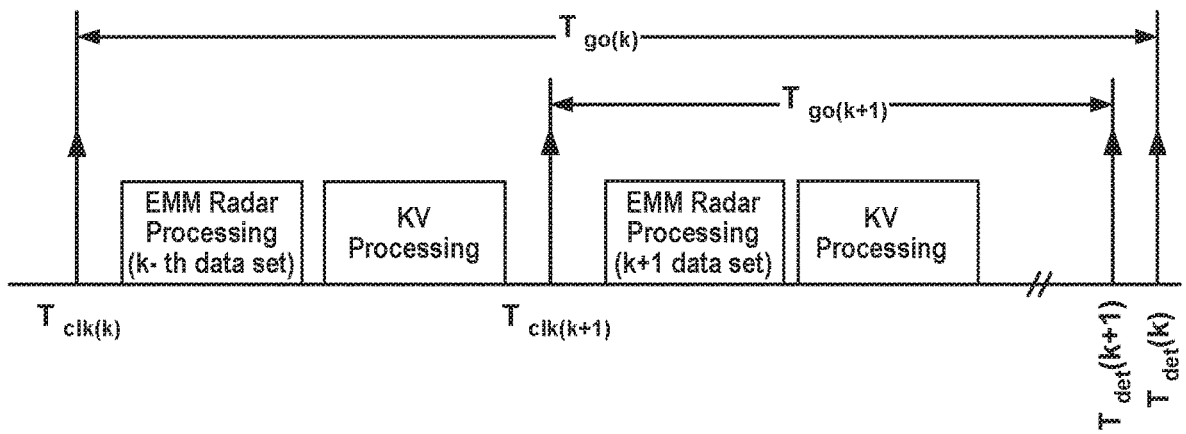
FIG. 38 shows a timing sequence for determining a detonation command.

FIG. 38 shows a timing sequence for determining a detonation command. Let index k indicate the sequence of measurements taken at time $t=T_{meas}(k)$. The radar measurements are then time tagged with $T_{meas}(k)$ to indicate the time of measurement. Note that the raw radar measurements are processed by a Kalman-type filter to generate Cartesian estimates of position, d(k), and velocity, v(k), for both the RPG and KV. The following discussion assumes the two measurements have been aligned to correspond to the same measurement time.

The relative positions and velocities at time $T_{meas}$ are given by:

$$d_{rel}(k) = d_{prj}(k) - d_{rpg}(k)$$

$$v_{rel}(k) = v_{prj}(k) - v_{rpg}(k) \qquad (36)$$

A reasonable estimate of the time to go is given by:

$$T_{go}(k) \sim \frac{|d_{rel}|}{|v_{rel}|} = \frac{|d_{rel}^T(k)d_{rel}(k)|}{|v_{rel}^T(k)v_{rel}(k)|} \qquad (37)$$

The detonation time is:

$$T_{det}(k) = T_{meas}(k) + T_{go}(k) \qquad (38)$$

Figure 39:
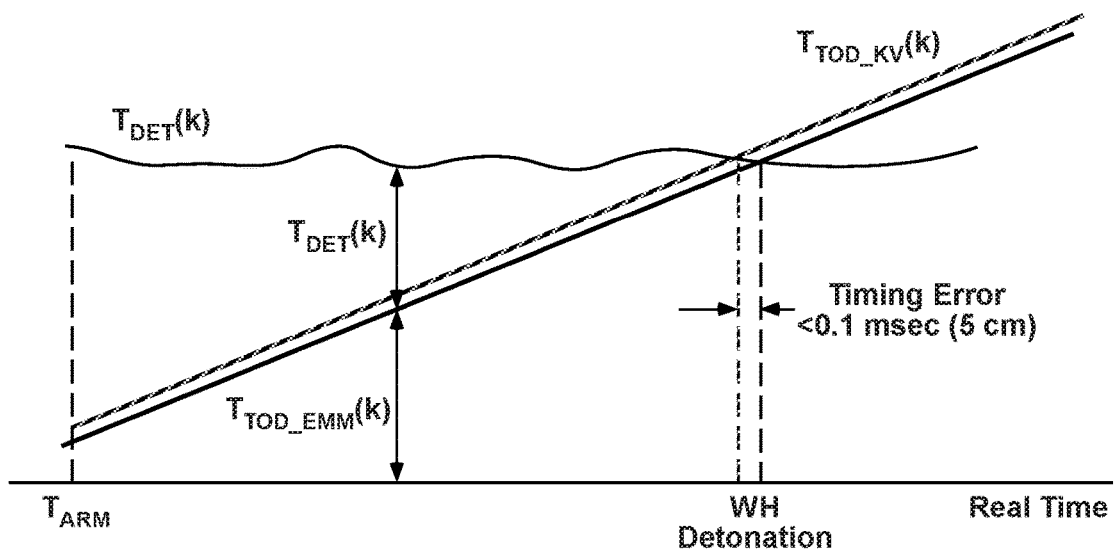
FIG. 39 illustrates a timing diagram for precision detonation of the KV warhead.

FIG. 39 illustrates a timing diagram for precision detonation of the KV warhead. The detonation time is transmitted to the KV via the command link. The KV compares the detonation time against its clock and fires when the times are equal. Note that it may be advisable to generate a leading detonation to account for any delay in the detonation circuitry. Note also that the detonation time will be continuously updated and therefore may vary during the flight time. However, it should converge to the required time as the projectile approaches the intercept point.

To a large extent, this detailed description has focused on a particular type of intercept vehicle (e.g., the eject vehicle 400). However, engagement management systems described herein may be used with many types of intercept vehicles in which the engagement management system can track the intercept vehicle, alter the course of the intercept vehicle, determine when to detonate the intercept vehicle, or combinations thereof using commands communicated between the engagement management system and the intercept vehicle.

Moreover, while embodiments of the present disclosure may be particularly suitable for use on aerial platforms, they may also be used in other types of mobile platforms like ground-based mobile platforms such as, for example, tanks, armored personnel carriers, personnel carriers (e.g., Humvee and Stryker vehicles) and other mobile platforms capable of bearing embodiments of the present disclosure. Moreover, embodiments of the present disclosure may be used for relatively stationary ground-based personnel protection wherein a mobile platform may not be involved. Accordingly, embodiments of the disclosure are not limited to aerial applications.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. An active protection system comprising:
   an intercept vehicle carried by an aircraft; and
   an engagement management system comprising a guidance processor configured to:
      generate launch commands for causing the intercept vehicle to be launched from the aircraft;
      generate timing and firing requirements for alignment thrusters of the intercept vehicle to perform a pitch maneuver to at least substantially align a longitudinal axis of the intercept vehicle with a intercept vector prior to initiating a rocket motor of the intercept vehicle; and
      transmit the timing and firing requirements for the alignment thrusters to the intercept vehicle.

2. The active protection system of claim 1, wherein the engagement management system further comprises a sensor configured to identify an aerial threat within a sensor range.

3. The active protection system of claim 2, wherein the sensor comprises at least one of a radar unit or an active laser.

4. The active protection system of claim 2, wherein the sensor is further configured to operate in a track mode during which the engagement management system tracks the identified aerial threat.

5. The active protection system of claim 2, wherein the sensor is further configured to be operable in a search mode during which the engagement management system searches for an aerial threat.

6. The active protection system of claim 2, wherein the sensor is further configured to be operable in a mixed track and search mode.

7. The active protection system of claim 1, wherein the aircraft comprises an unmanned airborne vehicle, a light aircraft, a low speed aircraft, a remotely piloted vehicle, a helicopter, or a hovering platform.

8. The active protection system of claim 1, further comprising a carrier disposed on the aircraft, the carrier carrying the intercept vehicle.

9. The active protection system of claim 1, wherein the engagement management system further comprises a communication unit configured to communicate with the intercept vehicle during the intercept vehicle's flight after launch from the aircraft.

10. The active protection system of claim 9, wherein the intercept vehicle further comprises divert thrusters configured to divert the intercept vehicle in a direction transverse to a flight path of the intercept vehicle.

11. The active protection system of claim 10, wherein the guidance processor is further configured to:
   generate guidance commands for the divert thrusters of the intercept vehicle to divert the intercept vehicle in a direction transverse to the flight path of the intercept vehicle after execution of the pitch maneuver; and
   transmit the guidance commands via the communication unit.

12. The active protection system of claim 9, wherein the communication unit comprises:
   a transmit processing chain including a digital-to-analog converter and an up converter;
   a receive processing chain including a down converter and an analog-to-digital converter; and
   a duplexing device operably coupled between the transmit processing chain and the receive processing chain.

13. The active protection system of claim 9, wherein the communication unit further comprises a command link radio.

14. The active protection system of claim 9, wherein the guidance processor is further configured to transmit a detonation command to the intercept vehicle via the communication unit for controlling detonation of a payload carried by the intercept vehicle.

15. The active protection system of claim 1, wherein the engagement management system further comprises an inertial navigation unit configured to determine an initial attitude of the intercept vehicle prior to launch of the intercept vehicle from the aircraft.

16. The active protection system of claim 1, wherein the guidance processor is further configured to transmit the timing and firing requirements for the alignment thrusters of the intercept vehicle to the intercept vehicle after launch of the intercept vehicle.

17. The active protection system of claim 9, wherein the aircraft comprises an unmanned airborne vehicle, a light aircraft, a low speed aircraft, a remotely piloted vehicle, a helicopter, or a hovering platform.

18. An active targeting system, comprising:
an intercept vehicle configured to be released from a platform, the intercept vehicle comprising:
alignment thrusters configured to rotate the intercept vehicle about an axis orthogonal to a longitudinal axis of the intercept vehicle to at least substantially align the longitudinal axis of the intercept vehicle with an intercept vector via a pitch maneuver; and
divert thrusters configured to divert the intercept vehicle in a direction transverse to a flight path of the intercept vehicle
an engagement management system disposed on the platform, the engagement management system comprising a guidance processor configured to generate guidance commands including divert thrust vectors for determining when to fire the divert thrusters of the intercept vehicle to divert the intercept vehicle in a direction transverse to the flight path of the intercept vehicle after the intercept vehicle is released from the platform.

19. The active targeting system of claim 18, wherein the intercept vehicle further comprises:
a rocket motor configured to accelerate the intercept vehicle along the intercept vector after the intercept vehicle performs the pitch maneuver; and
a heat generating payload.

20. The active targeting system of claim 18, wherein the guidance processor of the engagement management system is furthermore configured to transmit the guidance commands to the intercept vehicle.

21. The active targeting system of claim 18, wherein the engagement management system further comprises:
a sensor configured to detect and aerial threat within a sensor range of the sensor; and
a communication unit configured to communicate with the intercept vehicle during flight of the intercept vehicle after being released from the platform.

22. The active targeting system of claim 18, wherein the platform is a mobile platform.

23. The active targeting system of claim 22, wherein the mobile platform is selected from the group consisting of an aerial vehicle, a helicopter, an unmanned airborne vehicle (UAV), a remotely piloted vehicle (RPV), an aircraft, a light aircraft, a low speed aircraft, a hovering platform, a ground-based vehicle, a tank, an armored personnel carrier, and a personnel carrier.

24. The active targeting system of claim 18, wherein the platform is a stationary platform.

25. The active targeting system of claim 18, wherein the guidance processor is further configured to transmit the divert thrust vectors as inertial coordinates for conversion into body coordinates by the intercept vehicle.

26. A method of intercepting an aerial threat, comprising:
releasing an intercept vehicle from a platform during a first action of a launch sequence;
causing the intercept vehicle to perform a second different action of the launch sequence after releasing the intercept vehicle from the platform, the second different action comprising performing a pitch maneuver with a plurality of pitch thrusters of the intercept vehicle to align the intercept vehicle along an intercept vector pointed substantially toward a projected intercept point with an identified aerial threat; and
performing a divert maneuver with one or more divert thrusters of the intercept vehicle to divert the intercept vehicle from the intercept vector one or more times after commencement of accelerating the intercept vehicle.

27. The method of claim 26, further comprising causing the intercept vehicle to perform the second different action of the launch sequence after the intercept vehicle is a certain distance away from the platform.

28. The method of claim 26, wherein the first action of the launch sequence comprises releasing the intercept vehicle from a carrier disposed on the platform.

29. The method of claim 26, wherein the first action of the launch sequence comprises releasing the intercept vehicle from a carrier disposed on the platform into air deflected by the platform.

30. The method of claim 26, further comprising:
identifying the aerial threat within a sensor range of the platform;
determining the intercept vector for use by the intercept vehicle;
communicating at least one pitch command to the intercept vehicle to cause the intercept vehicle to perform the pitch maneuver;
detecting the intercept vehicle within the sensor range after the intercept vehicle has been released from the platform; and
communicating at least one guidance command to the intercept vehicle during flight to perform the divert maneuver via the one or more divert thrusters.

31. A method of engaging an aerial threat, comprising:
determining intercept vectors for respective use by one or more intercept vehicles responsive to information from detection of a targeted object and detection of the one or more intercept vehicles, the intercept vectors directed toward an interception point with a corresponding intercept vehicle and the targeted object;
generating and sending pitch commands to the one or more intercept vehicles to cause the one or more intercept vehicles to perform a pitch maneuver to orient the intercept vehicle toward its intercept vector after launch thereof;
determining flight adjustments for the one or more intercept vehicles during their respective flights; and
sending guidance commands related to the flight adjustments to the one or more intercept vehicles to cause divert thrusters of the one or more intercept vehicles to fire during their respective flights.

32. The method of claim 31, further comprising detecting an aerial threat to a base location and identifying the aerial threat as the targeted object.

33. An intercept vehicle, comprising:
a rocket motor configured to accelerate the intercept vehicle in direction collinear with a longitudinal axis of the intercept vehicle, and to impose a spin on the intercept vehicle;
divert thrusters, each divert thruster configured to, upon activation, laterally divert the intercept vehicle from a current flight path in a direction transverse to the longitudinal axis of the intercept vehicle; and
a controller configured to receive guidance commands from a remote engagement management system and activate one or more of the divert thrusters at different times and at specific spin positions during the current flight path toward an intercept point.

34. The intercept vehicle of claim 33, further comprising a telemetry unit configured to determine operation parameters of the intercept vehicle and transmit via the controller to the remote engagement management system for updating the guidance commands.

35. The intercept vehicle of claim 33, wherein the controller is configured to activate the one or more of the divert thrusters by:
selecting a next available divert thruster based, at least in part, on attitude information about the intercept vehicle and a thrust vector command; and
activating the next available divert thruster responsive to being aligned in a determined direction for achieving a desired divert angle.

36. The intercept vehicle of claim 33, wherein the controller is configured to activate one or more of the divert thrusters at different times and at specific spin positions by:
waiting until a magnitude of a divert velocity increment in an y-z plane exceeds a predetermined factor of a guidance velocity vector in the y-z plane;
identifying a divert thruster that has not been fired that meets an offset requirement for a desired divert angle; and
activating the identified divert thruster responsive to its orientation vector reaching the desired divert angle.

37. The intercept vehicle of claim 36, wherein the desired divert angle accounts for a smear angle due to body rotation of the intercept vehicle.

38. The intercept vehicle of claim 33, wherein the controller is configured to:
receive guidance commands from a remote engagement management system as inertial coordinates; and
project the inertial coordinates onto a body coordinate system for the intercept vehicle.

39. An intercept vehicle, comprising:
pitch thrusters mounted in a nose region of the intercept vehicle, the pitch thrusters configured and oriented to cause both a lateral and a rotational acceleration about a center of gravity of the intercept vehicle;
a boost motor configured to accelerate the intercept vehicle along a longitudinal axis of the intercept vehicle and to impose a spin on the intercept vehicle; and
a controller configured to activate one or more of the pitch thrusters responsive to receiving pitch commands from a remote engagement management system, and to orient a longitudinal axis of the intercept vehicle to point toward a targeted object after launch of the intercept vehicle and prior to activation of the boost motor.

40. The intercept vehicle of claim 39, wherein the pitch commands include a timing sequence for determining, when to fire, and an order to fire, each of the pitch thrusters.

41. The intercept vehicle of claim 39, wherein the controller is configured to activate the pitch thrusters to orient a longitudinal axis of the intercept vehicle to point toward a targeted object via a pitch maneuver such that a vector sum of an intercept vehicle velocity vector following launch and a velocity vector increment imparted by the boost motor following the pitch maneuver is oriented approximately along a desired line of sight unit vector oriented toward an intercept point with the targeted object.

42. The intercept vehicle of claim 39, wherein the controller is configured to activate opposite pairs of nose thrusters with at least some differential delay such that the opposite pairs if the nose thrusters burn at least partially overlapping in time.

43. The intercept vehicle of claim 42, wherein the opposite pairs of nose thrusters are configured to burn with approximately equal force and duration.

44. The intercept vehicle of claim 42, wherein the differential delay is defined as:

$$T_{dly} = \frac{I_{KV}\theta_{dt}}{F_{dt}D_{dt}T_{burn}},$$

wherein $I_{KV}$ is a moment of inertia for the intercept vehicle, $\theta_{dt}$ is a total rotation angle for the intercept vehicle, $F_{dt}$ is a time varying pitch thruster force, $D_{dt}$ is a distance from a center of gravity for the intercept vehicle, and $T_{burn}$ is a burn time for the pitch thrusters.

45. The intercept vehicle of claim 39, further comprising an attitude reference system configured to determine attitude information about the intercept vehicle and transmit the attitude information to the controller.

* * * * *